(12) United States Patent
Alcala Perez

(10) Patent No.: US 11,747,034 B2
(45) Date of Patent: *Sep. 5, 2023

(54) SYSTEMS AND METHODS FOR STEADY STATE DETECTION

(71) Applicant: Johnson Controls Tyco IP Holdings LLP, Milwaukee, WI (US)

(72) Inventor: Carlos Felipe Alcala Perez, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/496,910

(22) Filed: Oct. 8, 2021

(65) Prior Publication Data
US 2022/0026087 A1   Jan. 27, 2022

Related U.S. Application Data

(63) Continuation of application No. 16/657,514, filed on Oct. 18, 2019, now Pat. No. 11,168,910, which is a
(Continued)

(51) Int. Cl.
| | |
|---|---|
| G05B 99/00 | (2006.01) |
| F24F 11/30 | (2018.01) |
| H04L 67/12 | (2022.01) |
| F24F 11/62 | (2018.01) |
| G06Q 50/06 | (2012.01) |
| H04L 67/303 | (2022.01) |

(Continued)

(52) U.S. Cl.
CPC .............. *F24F 11/30* (2018.01); *F24F 11/62* (2018.01); *G05B 15/02* (2013.01); *G06Q 50/06* (2013.01); *H04L 67/12* (2013.01); *H04L 67/303* (2013.01); *F24F 11/63* (2018.01); *G05B 2219/2614* (2013.01); *G05B 2219/2642* (2013.01)

(58) Field of Classification Search
CPC ............................................. G05B 2219/2614
See application file for complete search history.

(56) References Cited

U.S. PATENT DOCUMENTS

| 8,731,724 B2 | 5/2014 | Drees et al. |
| 9,074,348 B2 | 7/2015 | Suzuki et al. |
| (Continued) | | |

FOREIGN PATENT DOCUMENTS

| JP | H07244523 A | * | 9/1995 |
| KR | 101151867 B1 | * | 5/2012 |

OTHER PUBLICATIONS

U.S. Appl. No. 14/744,761, filed Jun. 19, 2015, Johnson Controls Technology Company.
(Continued)

*Primary Examiner* — Suresh Suryawanshi
(74) *Attorney, Agent, or Firm* — Foley & Lardner LLP

(57) ABSTRACT

A method includes receiving samples of one or more monitored variables relating to building equipment, updating a statistical metric of the samples, determining whether the building equipment is operating in a steady state or operating in a transient state using the statistical metric of the samples, and adjusting an operation that uses the samples as an input based on whether the building equipment is operating in the steady state or operating in the transient state.

20 Claims, 15 Drawing Sheets

Related U.S. Application Data continuation of application No. 15/449,732, filed on Mar. 3, 2017, now Pat. No. 10,495,334, which is a continuation-in-part of application No. 15/279,336, filed on Sep. 28, 2016, now abandoned.

(51) Int. Cl.
*G05B 15/02* (2006.01)
*F24F 11/63* (2018.01)

(56) References Cited

U.S. PATENT DOCUMENTS

| | | |
|---|---|---|
| 2003/0100972 A1 | 5/2003 | Andersh et al. |
| 2003/0109951 A1 | 6/2003 | Hsiung et al. |
| 2004/0254762 A1 | 12/2004 | Hopkins et al. |
| 2005/0149297 A1 | 7/2005 | Guralnik et al. |
| 2006/0058898 A1 | 3/2006 | Emigholz et al. |
| 2006/0184264 A1 | 8/2006 | Willis et al. |
| 2007/0005311 A1 | 1/2007 | Wegerich et al. |
| 2007/0232045 A1 | 10/2007 | Lally et al. |
| 2008/0082302 A1 | 4/2008 | Samardzija et al. |
| 2009/0228129 A1 | 9/2009 | Moyne et al. |
| 2009/0228247 A1 | 9/2009 | Hendler et al. |
| 2009/0249128 A1 | 10/2009 | Heckman et al. |
| 2009/0276077 A1 | 11/2009 | Good et al. |
| 2010/0036529 A1 | 2/2010 | Landells et al. |
| 2010/0057237 A1 | 3/2010 | Kettaneh et al. |
| 2011/0047418 A1 | 2/2011 | Drees et al. |
| 2011/0257932 A1 | 10/2011 | Chu et al. |
| 2012/0022700 A1* | 1/2012 | Drees ............... H02J 13/00004 705/412 |
| 2012/0072029 A1 | 3/2012 | Persaud et al. |
| 2014/0365195 A1 | 12/2014 | Lahiri et al. |
| 2015/0051749 A1 | 2/2015 | Hancock et al. |
| 2015/0219530 A1 | 8/2015 | Li et al. |
| 2015/0222495 A1 | 8/2015 | Mehta et al. |
| 2015/0330650 A1* | 11/2015 | Abiprojo ................ F24F 11/39 700/276 |
| 2016/0180220 A1 | 6/2016 | Boettcher et al. |
| 2016/0370258 A1 | 12/2016 | Perez |
| 2017/0091870 A1 | 3/2017 | Trainor et al. |
| 2017/0220034 A1 | 8/2017 | Jahanshahi et al. |
| 2017/0366414 A1 | 12/2017 | Hamilton et al. |
| 2018/0046149 A1 | 2/2018 | Ahmed |

OTHER PUBLICATIONS

U.S. Appl. No. 15/188,824, filed Jun. 21, 2016, Johnson Controls Technology Company.
Alcala et al., Reconstruction-based Contribution for Process Monitoring, Proceedings of the 17th International Federation of Automatic Control World Congress, vol. 41, No. 2, Jul. 6-11, 2008, 6 pages.
Cao et al., An efficient method for on-line identification of steady state, Journal of Process Control, 5(6), 363-374.
Jiang et al., 2003, Application of steady-state detection method based on wavelet transform, Computer & chemical engineering, 27(4), 569-578.
Kelly et al., 2013, A steady-state detection (ssd) algorithm to detect non-stationary drifts in processes. Journal of Process Control, 23(3), 326-331.
Kim et al., 2008, Design of a steady-state detector for fault detection and diagnosis of a residential air conditioner. International Journal of Refrigeration, 31(5), 790-799.
Li et al., Generalized reconstruction-based contributions for output-relevant fault diagnosis with application to the Tennessee Eastman process, IEEE Transactions on Control Systems Technology, vol. 19, No. 5, Sep. 2011, 14 pages.
Mobley, K., Chapter 13: Operating Dynamics Analysis & Chapter 14: Failure-Mode Analysis in an Introduction to Predictive Maintenance, 2002, Butterworth-Heinemann, 60 pages.
Ng, et al., Multi-agent based collaborative fault detection and identification in chemical processes, Engineering Applications of Artificial Intelligence, vol. 23, No. 6, Sep. 2010, 16 pages.
Qin, S.J., Statistical process monitoring: basics and beyond, Journal of Chemometrics, vol. 17, Issue 8-9, Aug.-Sep. 2003, 23 pages.
Roh et al., 2010, Design method of steady state detector for multi-evaporator heat pump system and decomposition analysis technique.
Savitzky et al., 1964, Smoothing and differentiation of data by simplified least squares procedures, 36(8), 1627-1639.
Scheid, F., Theory and Problems of Numerical Analysis, Schaum's Outline Series, McGraw-Hill Book Company, 1968.
Wu et al., 2016, Online steady-state detection for process control using multiple change-point models and particle filters, IEEE Transactions on Automation Science and Engineering, 13(2), 688-700.
Yue et al., Reconstruction based fault identification using a combined index, Industrial & Engineering Chemistry Research, vol. 40, No. 20, Oct. 2001, 12 pages.

\* cited by examiner

SYSTEMS AND METHODS FOR STEADY STATE DETECTION

CROSS REFERENCE TO RELATED PATENT APPLICATIONS

This application is a continuation of U.S. patent application Ser. No. 16/657,514 filed Oct. 18, 2019, which is a continuation of U.S. patent application Ser. No. 15/449,732 filed Mar. 3, 2017 (now granted as U.S. Pat. No. 10,495,334), which is a continuation-in-part of U.S. patent application Ser. No. 15/279,336 filed Sep. 28, 2016, the entire disclosures of which are incorporated by reference herein.

BACKGROUND

The present disclosure relates generally to building management systems. The present disclosure relates more particularly to a building management system which identifies steady states for a process operated by equipment connected to the building management system.

A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

Systems and devices in a BMS often generate temporal (i.e., time-series) data that can be analyzed to determine the performance of the BMS and the various components thereof. From the data generated by the BMS, it can be detected whether the operation of various components (e.g., chiller, rooftop units, air handling units, variable refrigerant flow system, etc.) is in a steady state or transient state (e.g., a transition state). As used herein, a steady state refers to a state in which one or more variables associated with the operation of a component or a system are substantially unchanging or changing very slightly in time. A transient state refers to a state in which one or more variables associated with the operation of a component or a system are changing considerably in time and have not reached the steady state. Steady state identification can be useful in various applications. For example, the BMS may use only the temporal data generated during the steady state, but not use the temporal data generated during the transient state, for detecting, diagnosing, and/or predicting the system operation to avoid false detection, diagnosis, and/or prediction. In particular, the BMS may include various modelers that use temporal data generated during the steady state for estimating parameters in first principle models, estimating coefficients in regression models, calculating mass and energy balances, building principal component analysis (PCA) models, building partial least squares (PLS) models, and so on.

Typically, methods for steady state detection address a single variable associated with the operation process at a time, which can be expanded to multiple variables by applying to each of the variables independently. Furthermore, typical methods may need to tune several parameters in order to work properly. As such, these methods may be unaffordable given the minimal operational supervision and the low-cost nature of the industry (e.g., the HVAC industry). It would be desirable to have a system and method for steady state detection that provides reliable results in the situation of multiple variables at a low cost, and is robust to various types of data.

SUMMARY

One implementation of the present disclosure is a building management system (BMS). The BMS includes connected equipment configured to measure a plurality of monitored variables and a predictive diagnostics system. The predictive diagnostics system includes a communications interface configured to receive samples of the monitored variables from the connected equipment and a steady state detector. The steady state detector is configured to recursively update a mean and a variance of the samples each time a new sample is received, identify whether each of the samples reflects a steady state or a transient state of operation of the connected equipment using the mean and the variance, and associate each of the samples to the steady state or the transient state as identified. The predictive diagnostics system further includes a controller configured to adjust an operation of the connected equipment based on the steady state or the transient state as identified.

In some embodiments, the predictive diagnostic system includes a modeler configured to construct a model for predicting performance of the connected equipment using only the samples associated with the steady state. The controller may be configured to adjust the operation of the connected equipment using the model.

In some embodiments, the steady state detector is configured to recursively update a slope of the mean, a slope of the variance, and a second derivative of the variance of the samples each time a new sample is received. The steady state detector may be configured to combine the slope of the mean and the slope of variance to generate a combined slope and use the combined slope and the second derivative of the variance of the samples to identify.

In some embodiments, the steady state detector is configured to determine whether a current state of the operation of the connected equipment is the steady state or the transient state. In response to determining that the current state is the transient state, the steady state detector may determine whether the combined slope is no greater than a first threshold and whether the second derivative of the variance is positive. In response to determining that the combined slope is no greater than a first threshold and the second derivative of the variance is positive, the steady state detector may determine that the operation of the connected equipment has switched to the steady state and associate the new sample with the steady state.

In some embodiments, determining that the combined slope is no greater than a first threshold and that the second derivative of the variance is positive includes determining that the combined slope is no greater than a first threshold and that the second derivative of the variance for several consecutive samples.

In some embodiments, the steady state detector is configured to determine whether a current state of the operation of the connected equipment is the steady state or the transient state. In response to determining that the current state is the transient state, the steady state detector may determine whether the combined slope is no greater than a first threshold and whether the second derivative of the variance is positive. In response to determining that the combined slope is greater than a first threshold, or that the second derivative of the variance is not positive, or both, the steady state detector may determine that the operation of the connected equipment remains in the transient state and associate the new sample with the transient state.

In some embodiments, the steady state detector is configured to determine whether a current state of the operation of the connected equipment is the steady state or the transient state. In response to determining that the current state is the steady state, the steady state detector may determine whether the combined slope is greater than a first threshold. In response to determining that the combined slope is greater than a first threshold, the steady state detector may determine that the operation of the connected equipment has switched to the transient state and associate the new sample with the transient state.

In some embodiments, determining that the combined slope is greater than the first threshold includes determining that the combined slope is greater than the first threshold for several consecutive samples.

In some embodiments, the steady state detector is configured to determine whether a current state of the operation of the connected equipment is the steady state or the transient state. In response to determining that the current state is the steady state, the steady state detector may determine whether the combined slope is greater than a first threshold. In response to determining that the combined slope is greater than a first threshold, the steady state detector may determine whether a change of the variance of the samples is greater than a second threshold. In response to determining that the change of the variance is greater than the second threshold, the steady state detector may determine that the operation of the connected equipment has switched to the transient state and associate the new sample with the transient state.

In some embodiments, the steady state detector is configured to determine whether a current state of the operation of the connected equipment is the steady state or the transient state. In response to determining that the current state is the steady state, the steady state detector may determine whether the combined slope is greater than a first threshold. In response to determining that the combined slope is no greater than a first threshold, the steady state detector may determine that the operation of the connected equipment remains in the steady state and associate the new sample with the steady state.

Another implementation of the present disclosure is a method for monitoring and controlling connected equipment in a building management system. The method includes measuring a plurality of monitored variables at the connected equipment, receiving samples of the monitored variables at a predictive diagnostics system, recursively updating a mean and a variance of the samples each time a new sample is received, identifying whether each of the samples reflects a steady state or a transient state of operation of the connected equipment using the mean and the variance, associating each of the samples to the steady state or the transient state as identified, and adjusting an operation of the connected equipment based on the steady state or the transient state as identified.

In some embodiments, the method includes constructing a model for predicting performance of the connected equipment using only the samples associated with the steady state and adjusting the operation of the connected equipment using the model.

In some embodiments, the method includes recursively updating a slope of the mean, a slope of the variance, and a second derivative of the variance of the samples each time a new sample is received. The method may include combining the slope of the mean and the slope of variance to generate a combined slope and using the combined slope and the second derivative of the variance of the samples to identify the steady state or the transient state.

In some embodiments, the method includes determining whether a current state of the operation of the connected equipment is the steady state or the transient state. In response to determining that the current state is the transient state, the method may include determining whether the combined slope is no greater than a first threshold and whether the second derivative of the variance is positive. In response to determining that the combined slope is no greater than a first threshold and the second derivative of the variance is positive, the method may include determining that the operation of the connected equipment has switched to the steady state and associating the new sample with the steady state.

In some embodiments, the method includes determining whether a current state of the operation of the connected equipment is the steady state or the transient state. In response to determining that the current state is the transient state, the method may include determining whether the combined slope is no greater than a first threshold and whether the second derivative of the variance is positive. In response to determining that the combined slope is greater than a first threshold, or that the second derivative of the variance is not positive, or both, the method may include determining that the operation of the connected equipment remains in the transient state and associating the new sample with the transient state.

In some embodiments, the method includes determining whether a current state of the operation of the connected equipment is the steady state or the transient state. In response to determining that the current state is the steady state, the method may include determining whether the combined slope is greater than a first threshold. In response to determining that the combined slope is greater than a first threshold, the method may include determining that the operation of the connected equipment has switched to the transient state and associating the new sample with the transient state.

In some embodiments, the method includes determining whether a current state of the operation of the connected equipment is the steady state or the transient state. In response to determining that the current state is the steady state, the method may include determining whether the combined slope is greater than a first threshold. In response to determining that the combined slope is greater than a first threshold, the method may include determining whether a change of the variance of the samples is greater than a second threshold. In response to determining that the change of the variance is greater than the second threshold, the method may include determining that the operation of the connected equipment has switched to the transient state and associating the new sample with the transient state.

In some embodiments, the method includes determining whether a current state of the operation of the connected equipment is the steady state or the transient state. In response to determining that the current state is the steady state, the method may include determining whether the combined slope is greater than a first threshold. In response to determining that the combined slope is no greater than a first threshold, the method may include determining that the operation of the connected equipment remains in the steady state and associate the new sample with the steady state.

Another implementation of the present disclosure is a heating, ventilation, or air conditioning (HVAC) system. The HVAC system includes connected equipment configured to measure a plurality of monitored variables and a predictive diagnostics system. The predictive diagnostics system is configured to receive samples of the monitored variables from the connected equipment and recursively update a variance of the samples, a slope of the variance, and a second derivative of the variance each time a new sample is received. The predictive diagnostics system is configured to determine whether the slope is no greater than a first threshold and whether the second derivative of the variance is positive. In response to determining that the slope is no greater than the first threshold and the second derivative of the variance is positive, the predictive diagnostics system may associate the new sample with a steady state operation of the connected equipment. The HVAC system further includes a controller configured to adjust an operation of the connected equipment based on whether the new sample is associated with the steady state or a transient state.

In some embodiments, the predictive diagnostic system includes a modeler configured to construct a model for predicting performance of the connected equipment using only the samples associated with the steady state, wherein the controller is configured to adjust the operation of the connected equipment using the model Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, a building management system (BMS) and various components thereof are shown, according to some embodiments. The BMS includes sensors, building equipment, a building controller, and a predictive diagnostics system. The sensors monitor variables in or around a building and the building equipment operate to affect one or more of the monitored variables. The building controller generates control signals for the building equipment based on the monitored variables. The predictive diagnostics system uses a steady state detector to identify the steady state and transient state for the process operated by the building equipment.

As used herein, a steady state refers to a state in which one or more monitored variables associated with the operation of a component of the building equipment are substantially unchanging or changing very slightly in time. A transient state refers to a state in which one or more monitored variables associated with the operation of a component of the building equipment are changing considerably in time and have not reached the steady state. Variables monitored during the steady state may reflect the normal operation of the building equipment.

Variables monitored during the transient state may reflect abnormal operation, which may sometimes be mistakenly considered as faults. Thus, the predictive diagnostic system may use only the monitored variables associated with the steady state, but not use the monitored variables associated with the transient state, for detecting, diagnosing, and/or predicting the system operation to avoid false detection, diagnosis, and/or prediction. In particular, the predicative diagnostic system may include various modelers that use monitored variables associated with steady state for estimating parameters in first principle models, estimating coefficients in regression models, calculating mass and energy balances, building principal component analysis (PCA) models, building partial least squares (PLS) models, and so on. The building controller may use the detection, diagnosis, and/or predication provided by the predicative diagnosis system in deciding the control for the building equipment. These and other features of the steady state detector are described in greater detail below.

Building HVAC Systems and Building Management Systems

Figure 1:
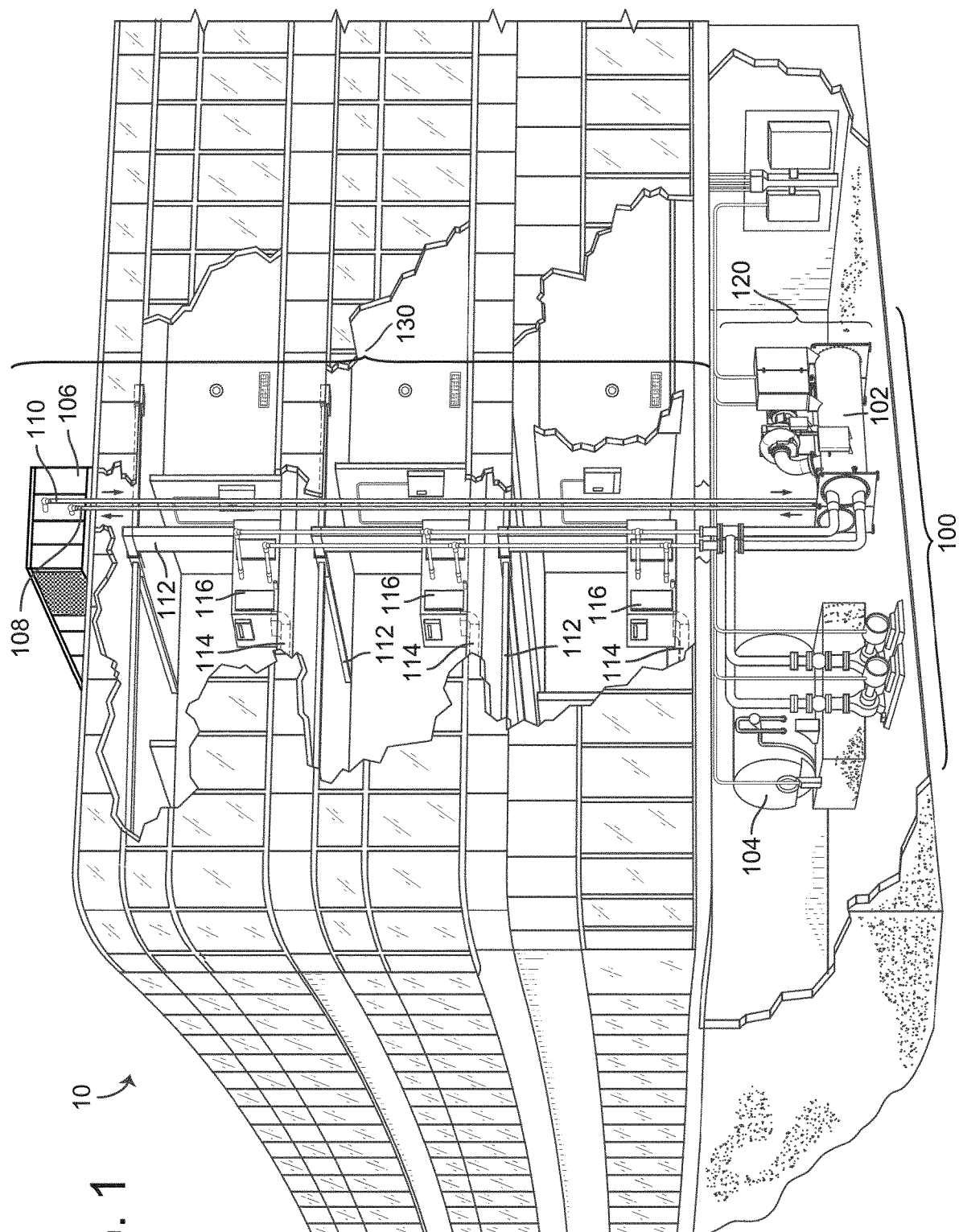
FIG. 1 is a drawing of a building equipped with a HVAC system, according to some embodiments.
Figure 2:
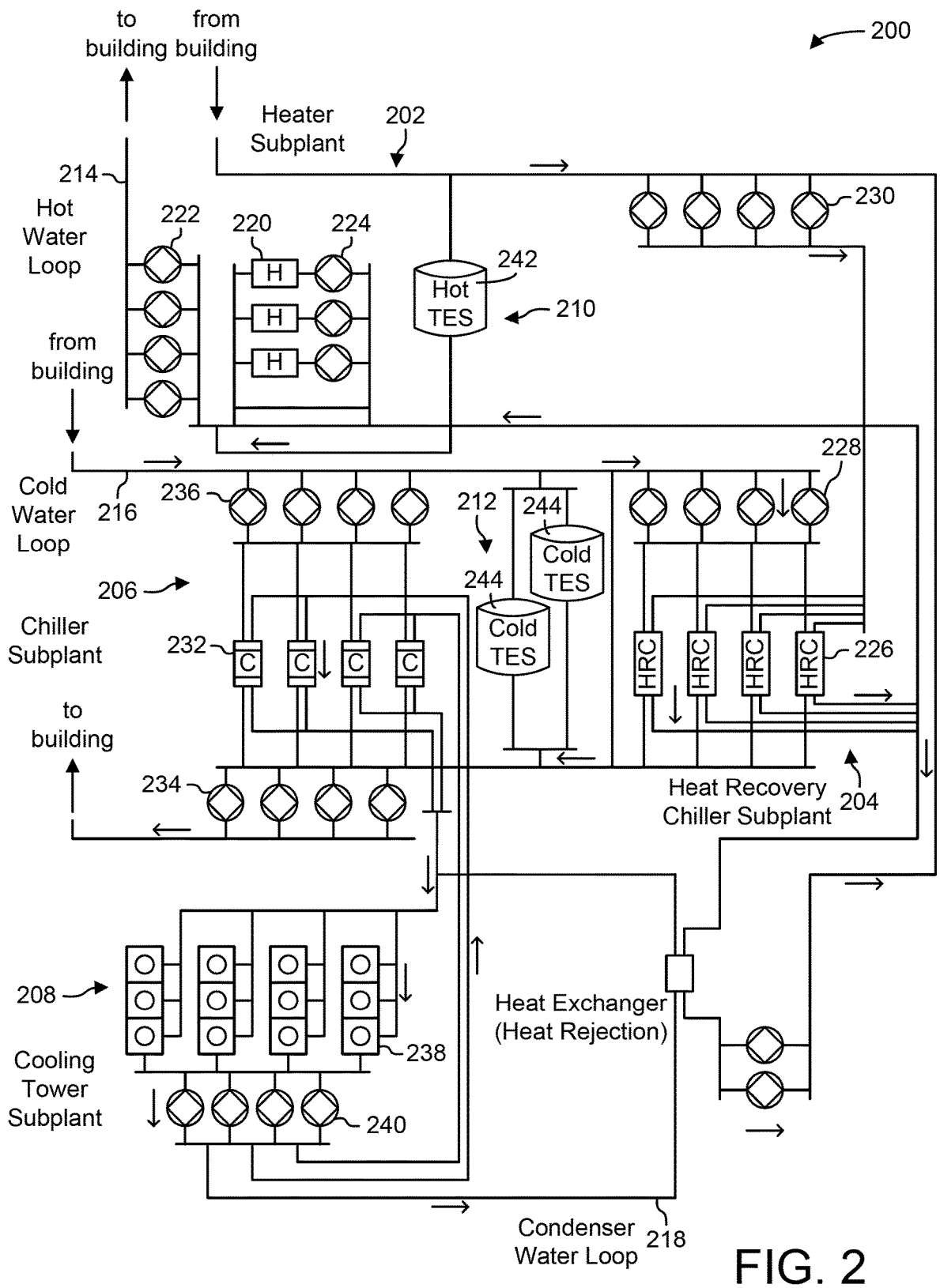
FIG. 2 is a schematic diagram of a waterside system which can be used in conjunction with the building of FIG. 1, according to some embodiments.
Figure 3:
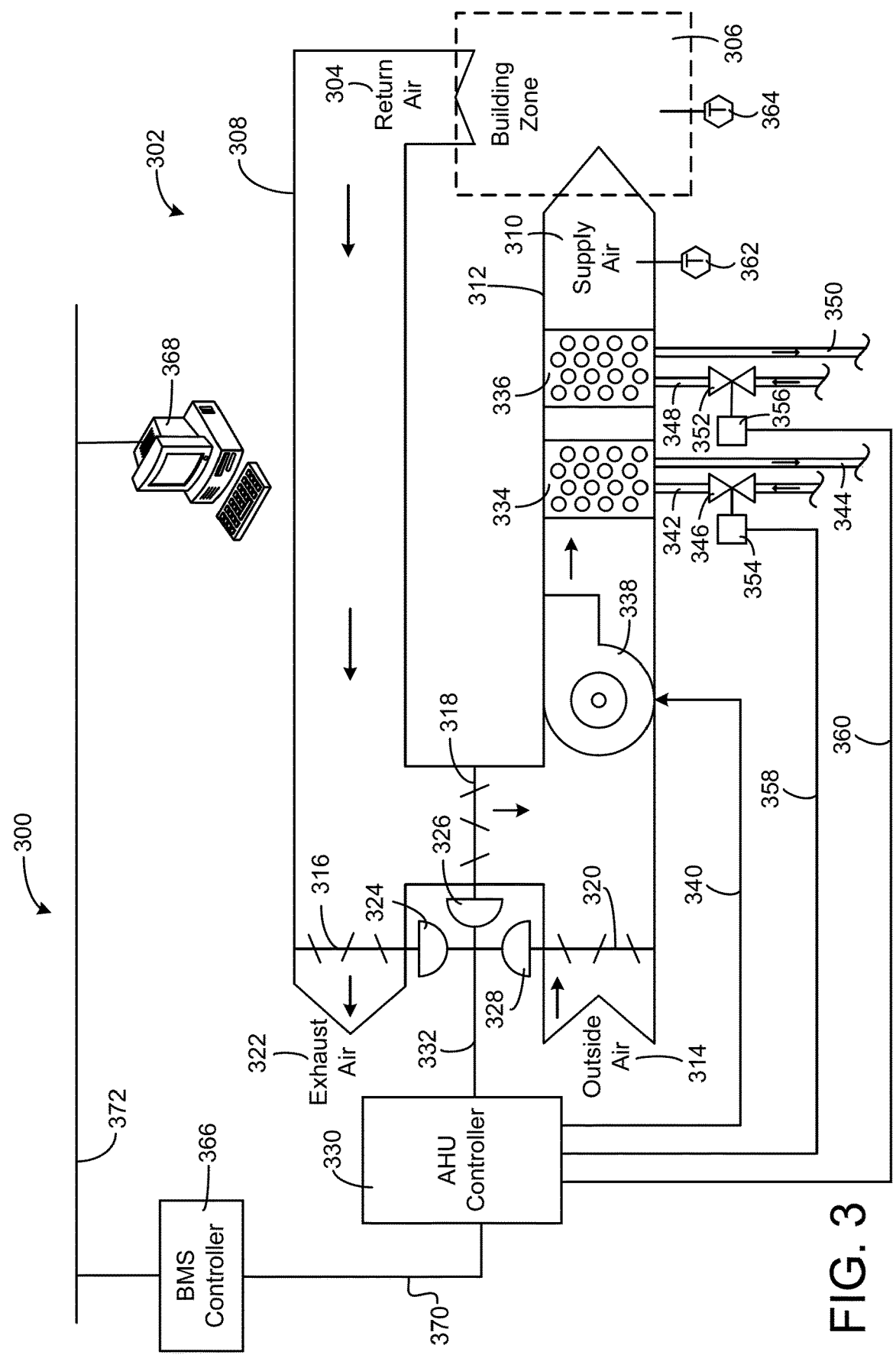
FIG. 3 is a schematic diagram of an airside system which can be used in conjunction with the building of FIG. 1, according to some embodiments.
Figure 4:
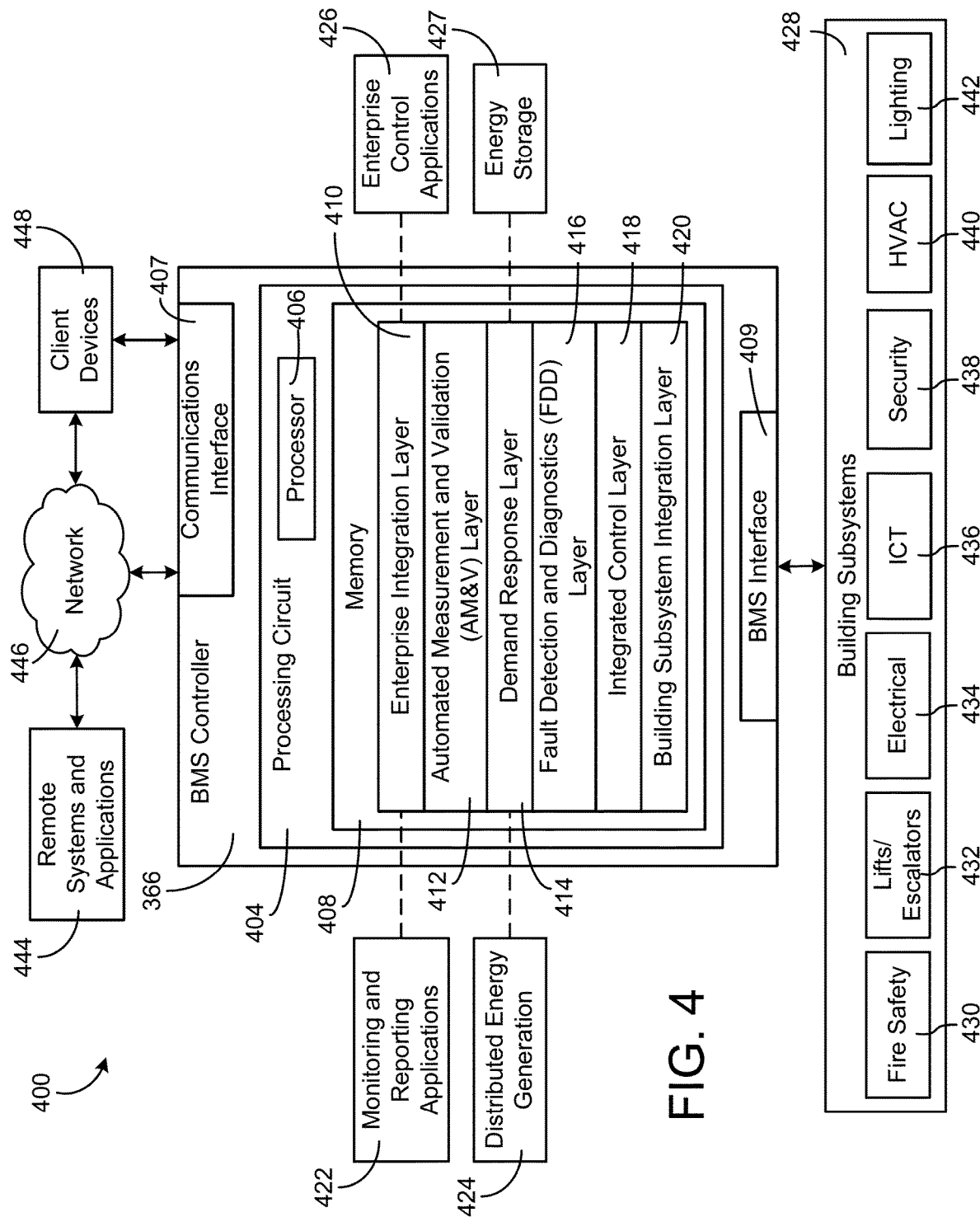
FIG. 4 is a block diagram of a building management system (BMS) which can be used to monitor and control the building of FIG. 1, according to some embodiments.
Figure 5:
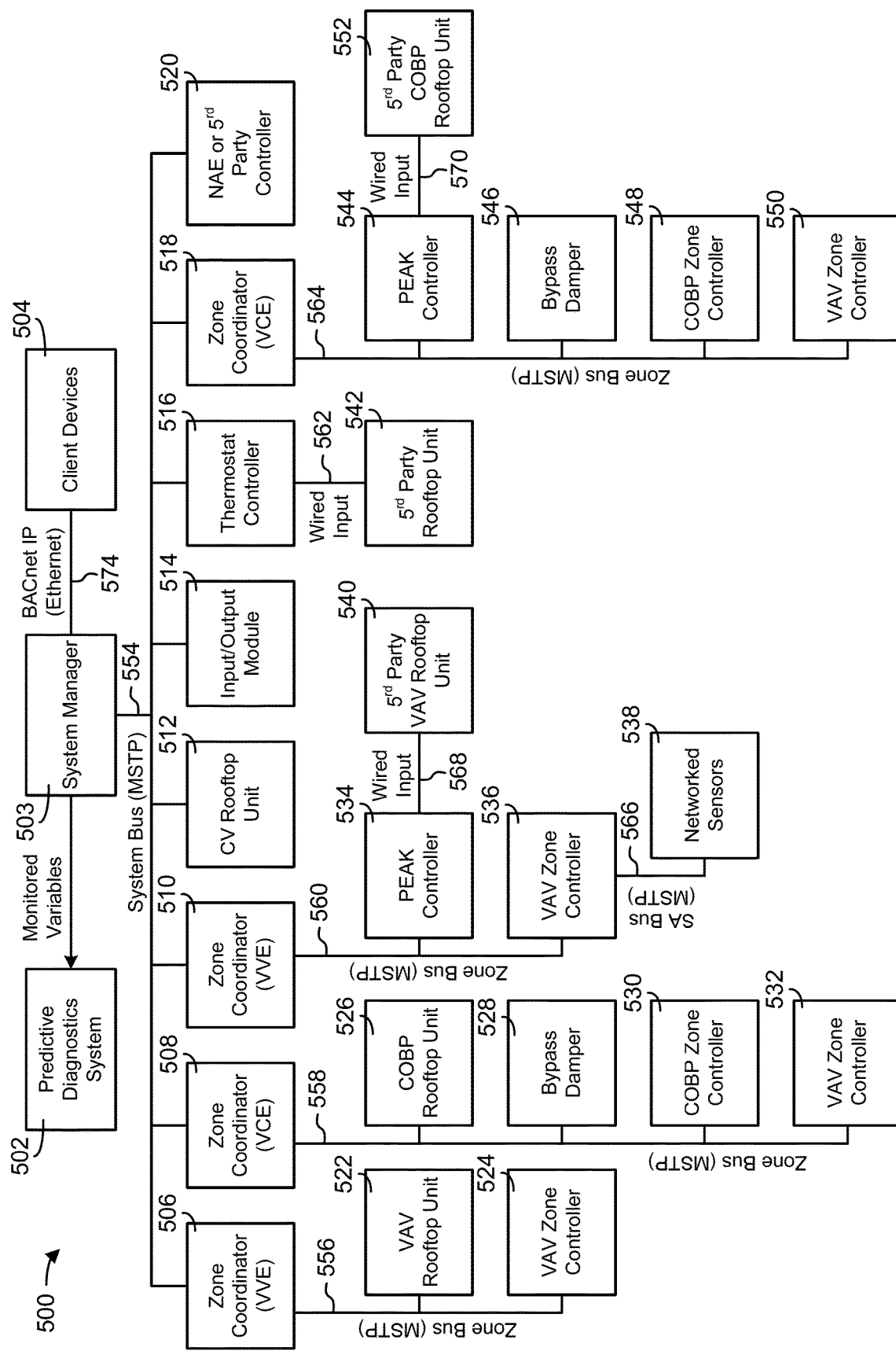
FIG. 5 is a block diagram of another BMS including a predictive diagnostics system which can be used to detect and diagnose faults in the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building 10 and HVAC System 100

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System 200

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System 300

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management System 400

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints)

which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Building Management System 500

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a predictive diagnostics system 502, a system manager 503; several zone coordinators 506, 508, 510 and 518; and several zone controllers 524, 530, 532, 536, 548, and 550. System manager 503 can monitor various data points in BMS 500 and report monitored variables to predictive diagnostics system 502. System manager 503 can communicate with client devices 504 (e.g., user devices, desktop computers, laptop computers, mobile devices, etc.) via a data communications link 574 (e.g., BACnet IP, Ethernet, wired or wireless communications, etc.). System manager 503 can provide a user interface to client devices 504 via data communications link 574. The user interface may allow users to monitor and/or control BMS 500 via client devices 504.

In some embodiments, system manager 503 is connected with zone coordinators 506-510 and 518 via a system bus 554. System manager 503 can be configured to communicate with zone coordinators 506-510 and 518 via system bus 554 using a master-slave token passing (MSTP) protocol or any other communications protocol. System bus 554 can also connect system manager 503 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 503 and can be connected directly to system bus 554. Other RTUs can communicate with system manager 503 via an intermediate device. For example, a wired input 562 can connect a third-party RTU 542 to thermostat controller 516, which connects to system bus 554.

System manager 503 can provide a user interface for any device containing an equipment model. Devices such as zone coordinators 506-510 and 518 and thermostat controller 516 can provide their equipment models to system manager 503 via system bus 554. In some embodiments, system manager 503 automatically creates equipment models for connected devices that do not contain an equipment model (e.g., IOM 514, third party controller 520, etc.). For example, system manager 503 can create an equipment model for any device that responds to a device tree request. The equipment models created by system manager 503 can be stored within system manager 503. System manager 503 can then provide a user interface for devices that do not contain their own equipment models using the equipment models created by system manager 503. In some embodiments, system manager 503 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Connected Equipment and Predictive Diagnostics

Figure 6A:
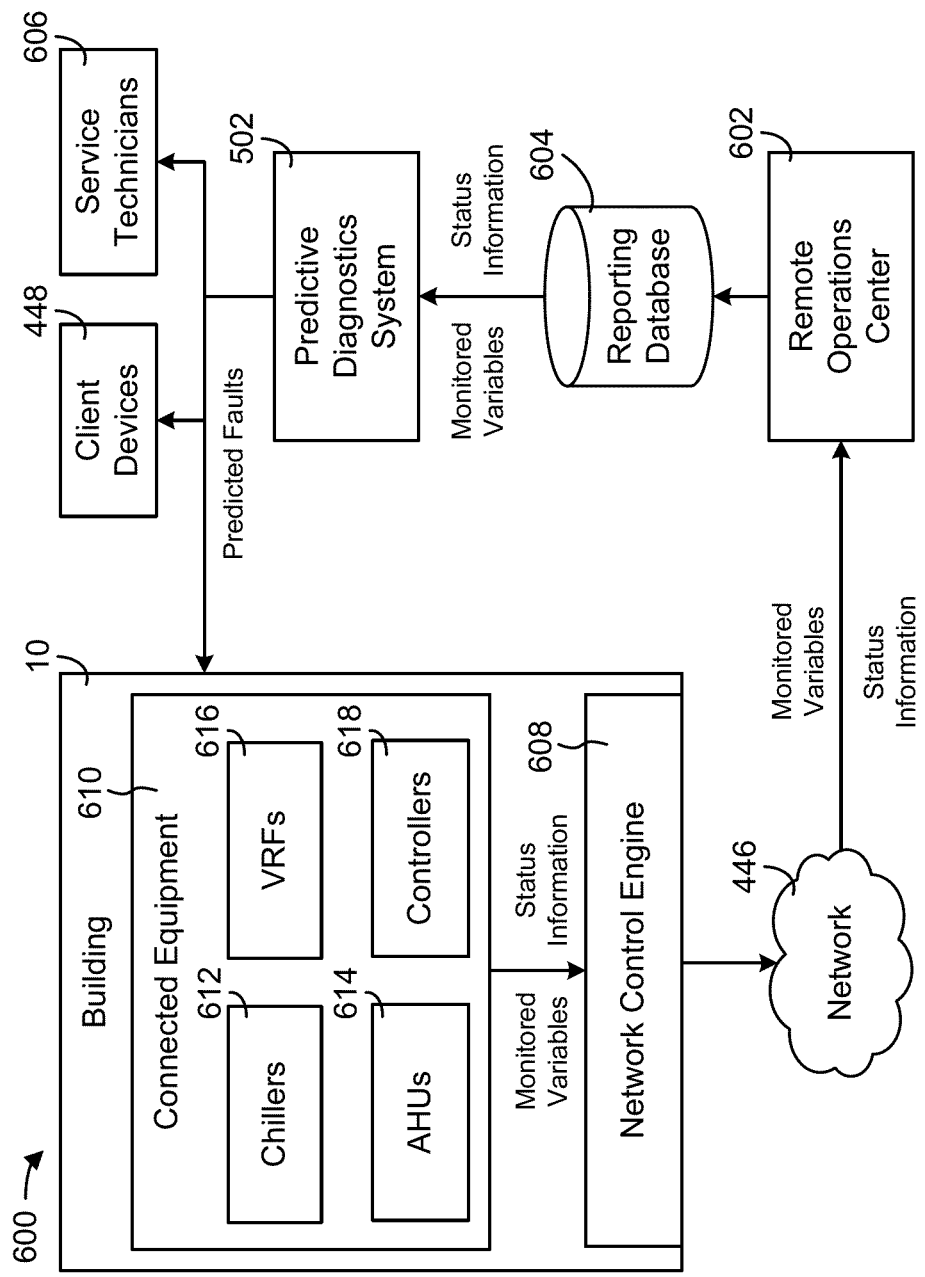
FIG. 6A is a block diagram of yet another BMS including the predictive diagnostics system, according to some embodiments.

Referring now to FIG. 6A, a block diagram of another building management system (BMS) 600 is shown, according to some embodiments. BMS 600 can include many of the same components as BMS 400 and BMS 500 as described with reference to FIGS. 4-5. For example, BMS 600 is shown to include building 10, network 446, client devices 448, and predictive diagnostics system 502. Building 10 is shown to include connected equipment 610, which can include any type of equipment used to monitor and/or control building 10. Connected equipment 610 can include connected chillers 612, connected AHUs 614, connected variable refrigerant flow systems (VRFs) 616, connected controllers 618, or any other type of equipment in a building HVAC system (e.g., boilers, economizers, valves, dampers, cooling towers, fans, pumps, etc.) or building management system (e.g., lighting equipment, security equipment, refrigeration equipment, etc.). Connected equipment 610 can include any of the equipment of HVAC system 100, waterside system 200, airside system 300, BMS 400, and/or BMS 500, as described with reference to FIGS. 1-5.

Connected equipment 610 can be outfitted with sensors to monitor particular conditions of the connected equipment 610. For example, chillers 612 can include sensors configured to monitor chiller variables such as chilled water temperature, condensing water temperature, and refrigerant properties (e.g., refrigerant pressure, refrigerant temperature, etc.) at various locations in the refrigeration circuit. An example of a chiller 630 which can be used as one of chillers 612 is described in greater detail with reference to FIG. 6C.

Similarly, AHUs 616 can be outfitted with sensors to monitor AHU variables such as supply air temperature and humidity, outside air temperature and humidity, return air temperature and humidity, chilled fluid temperature, heated fluid temperature, damper position, etc. In general, connected equipment 610 monitor and report variables that characterize the performance of the connected equipment 610. Each monitored variable can be forwarded to network control engine 608 as a data point including a point ID and a point value.

Monitored variables can include any measured or calculated values indicating the performance of connected equipment 610 and/or the components thereof. For example, monitored variables can include one or more measured or calculated temperatures (e.g., chilled water temperature, return water temperature, refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, compressor power, water consumption, electricity consumption, etc.), control setpoints, model parameters (e.g., regression model coefficients), or any other time-series values that provide information about how the corresponding system, device, or process is performing. Monitored variables can be received from connected equipment 610 and/or from various components thereof. For example, monitored variables can be received from one or more controllers (e.g., BMS controllers, subsystem controllers, HVAC controllers, subplant controllers, AHU controllers, device controllers, etc.), BMS devices (e.g., chillers, VRFs, cooling towers, pumps, heating elements, etc.), or collections of BMS devices.

Connected equipment 610 can also report equipment status information. Equipment status information can include, for example, the operational status of the equipment, an operating mode (e.g., low load, medium load, high load, etc.), an indication of whether the equipment is running under normal or abnormal conditions, a safety fault code, or any other information that indicates the current status of connected equipment 610. In some embodiments, each device of connected equipment 610 includes a control panel (e.g., control panel 660 shown in FIG. 6C). The control panel can use the sensor data to shut down the device if the control panel determines that the device is operating under unsafe conditions. For example, the control panel can compare the sensor data (or a value derived from the sensor data) to predetermined thresholds. If the sensor data or calculated value crosses a safety threshold, the control panel can shut down the device. The control panel can generate a data point when a safety shut down occurs. The data point can include a safety fault code which indicates the reason or condition that triggered the shutdown.

Connected equipment 610 can provide monitored variables and equipment status information to a network control engine 608. Network control engine 608 can include a building controller (e.g., BMS controller 366), a system manager (e.g., system manager 503), a network automation engine (e.g., NAE 520), or any other system or device of building 10 configured to communicate with connected equipment 610. In some embodiments, the monitored variables and the equipment status information are provided to network control engine 608 as data points. Each data point can include a point ID and a point value. The point ID can identify the type of data point or a variable measured by the data point (e.g., condenser pressure, refrigerant temperature, fault code). Monitored variables can be identified by name or by an alphanumeric code (e.g., Chilled_Water_Temp, 7694, etc.). The point value can include an alphanumeric value indicating the current value of the data point (e.g., 44° F., fault code 4, etc.).

Network control engine 608 can broadcast the monitored variables and the equipment status information to a remote operations center (ROC) 602. ROC 602 can provide remote monitoring services and can send an alert to building 10 in the event of a critical alarm. ROC 602 can push the monitored variables and equipment status information to a reporting database 604, where the data is stored for reporting and analysis. Predictive diagnostics system 502 can access database 604 to retrieve the monitored variables and the equipment status information.

In some embodiments, predictive diagnostics system 502 is a component of BMS controller 366 (e.g., within FDD layer 416). For example, predictive diagnostics system 502 can be implemented as part of a METASYS® brand building automation system, as sold by Johnson Controls Inc. In other embodiments, predictive diagnostics system 502 can be a component of a remote computing system or cloud-based computing system configured to receive and process data from one or more building management systems. For example, predictive diagnostics system 502 can be implemented as part of a PANOPTIX® brand building efficiency platform, as sold by Johnson Controls Inc. In other embodiments, predictive diagnostics system 502 can be a component of a subsystem level controller (e.g., a HVAC controller), a subplant controller, a device controller (e.g., AHU controller 330, a chiller controller, etc.), a field controller, a computer workstation, a client device, or any other system or device that receives and processes monitored variables from connected equipment 610. In some embodiments, predictive diagnostics system 502 is a component of a smart HVAC device (e.g., a smart chiller, a smart actuator, a smart AHU, etc.) and can be implemented as part of connected equipment 610. This embodiment is described in greater detail with reference to FIG. 6B.

Predictive diagnostics system 502 may use the monitored variables to identify a steady state or a transient state for operation of connected equipment 610. In further embodiments, predictive diagnostics system 502 may associate monitored variables with either steady state or transient state. If monitored variables reflect the operation at the time determined to be under steady sate, the monitored variables are associated with steady state. If monitored variables reflect the operation at the time determined to be under transient state, the monitored variables are associated with transient state. Monitored variables associated with the steady state may reflect the normal operation of connected equipment 610. Monitored variables associated with transient state may reflect abnormal operation, which may sometimes be mistakenly considered as faults. Thus, predictive diagnostics system 502 may use only the monitored variables associated with the steady state, but not use the monitored variables associated with the transient state, for detecting, diagnosing, and/or predicting the operation of connected equipment 610. In some embodiments, predicative diagnostics system 502 includes various modelers that use monitored variables associated with steady state for estimating parameters in first principle models, estimating coefficients in regression models, calculating mass and energy balances, building principal component analysis (PCA) models, building partial least squares (PLS) models, and so on.

In some embodiments, predictive diagnostics system 502 may use the monitored variables associated with the detected state (i.e., steady state or transient state) to identify a current operating state for connected equipment 610. The current operating state can be examined by predictive diagnostics system 502 to expose when connected equipment 610 begins to degrade in performance and/or to predict when faults will occur. In some embodiments, predictive diagnostic system 502 determines whether the current operating state is a normal operating state or a faulty operating state. Predictive diagnostics system 502 may report the current operating state and/or the predicted faults to client devices 448, service technicians 606, building 10, or any other system or device. Communications between predictive diagnostics system 502 and other systems or devices can be direct or via an intermediate communication network, such as network 446. If the current operating state is identified as a faulty state or moving toward a faulty state, predictive diagnostics system 502 may generate an alert or notification for service technician 606 to repair the fault or potential fault before it becomes more severe. In some embodiments, predicative diagnostics system 502 uses the current operating state to determine an appropriate control action for connected equipment 610.

In some embodiments, predictive diagnostics system 502 includes a data analytics and visualization platform. Predictive diagnostics system 502 can analyze the monitored variables associated with the detected state (i.e., steady state or transient state) to predict when a fault will occur in the connected equipment 610. Predictive diagnostics system 502 can predict the type of fault and a time at which the fault will occur. For example, predictive diagnostics system 502 can predict when connected equipment 610 will next report a safety fault code that triggers a device shut down. Advantageously, the faults predicted by predictive diagnostics system 502 can be used to determine that connected equipment 610 is in need of preventative maintenance to avoid an unexpected shut down due to the safety fault code. Predictive diagnostics system 502 can provide the predicted faults to service technicians 606, client devices 448, building 10, or other systems or devices.

In some embodiments, predictive diagnostics system 502 provides a web interface which can be accessed by service technicians 606, client devices 448, and other systems or devices. The web interface can be used to access the raw data and detected steady or transient state associated with the raw data in reporting database 604, view the results of the predictive diagnostics, identify which equipment is in need of preventative maintenance, and otherwise interact with predictive diagnostics system 502. Service technicians 606 can access the web interface to view a list of equipment for which faults are predicted by predictive diagnostics system 502. Service technicians 606 can use the predicted faults to proactively repair connected equipment 610 before a fault and/or an unexpected shut down occurs. These and other features of predictive diagnostics system 502 are described in greater detail below.

Figure 6B:
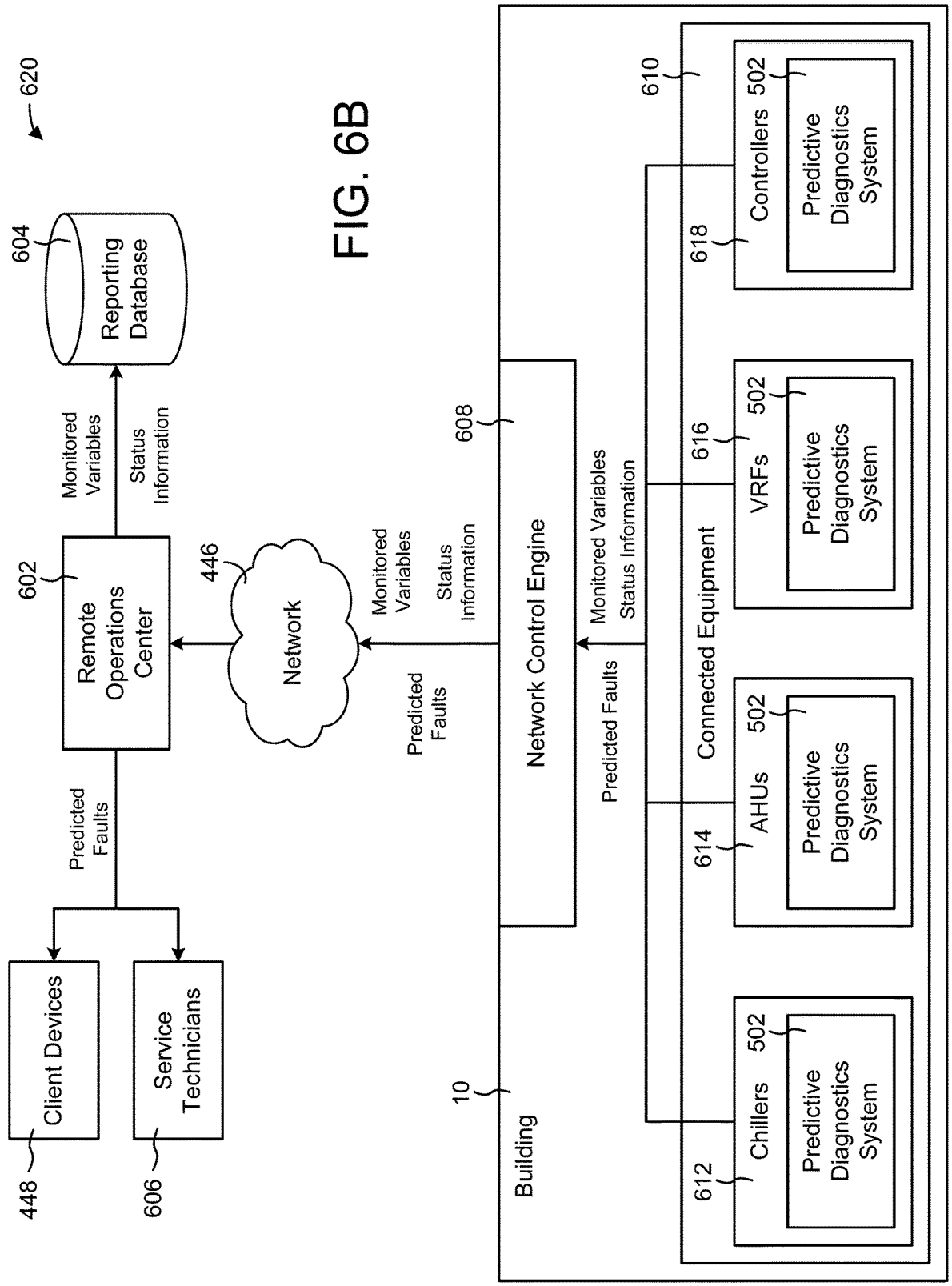
FIG. 6B is a block diagram of yet another BMS in which the predictive diagnostics system is implemented as a component of individual devices of connected equipment, according to some embodiments.

Referring now to FIG. 6B, a block diagram of another BMS 620 is shown, according to some embodiments. BMS 620 can include many of the same components as BMS 600, as described with reference to FIG. 6A. For example, BMS 620 is shown to include building 10, network 446, remote operations center 602, reporting database 604, client devices 448, and service technicians 606. Building 10 is shown to include various types of connected equipment 610 including connected chillers 612, connected AHUs 614, connected VRFs 616, and connected controllers 618. Although only a few types of connected equipment 610 are shown, it should be understood that building 10 can include any other type of equipment in a building HVAC system (e.g., boilers, economizers, valves, dampers, cooling towers, fans, pumps, or other HVAC devices) or building management system (e.g., lighting equipment, security equipment, refrigeration equipment, etc.). Connected equipment 610 can include any of the equipment of HVAC system 100, waterside system 200, airside system 300, BMS 400, BMS 500, and/or BMS 600, as described with reference to FIGS. 1-6A.

BMS 620 is shown to include multiple instances of predictive diagnostics system 502. Predictive diagnostics system 502 can be the same or similar as previously described. However, unlike BMS 600 in which predictive diagnostics system 502 is implemented as a separate component of the BMS, BMS 620 can incorporate predictive diagnostics system 502 as a component of one or more devices of connected equipment 610. For example, each of chillers 612, AHUs 614, VRFs 616, and controllers 618 is shown to include an instance of predictive diagnostics system 502. By including an instance of predictive diagnostics system 502 within various devices of connected equipment 610, steady state identification, modeling, fault detection, and fault prediction can be performed locally by individual devices of connected equipment 610. This allows for local steady state identification, modeling, fault detection, and fault prediction at the equipment level without requiring connected equipment 610 to report monitored variables and/or status information to a remote system or device.

In some embodiments, one or more of the devices of connected equipment 610 are HVAC devices. Each HVAC device can include one or more sensors, a predictive diagnostics system 502, and a controller. The sensors can be configured to measure a plurality of monitored variables and provide samples of the monitored variables to the predictive diagnostics system 502. Each instance of predictive diagnostics system 502 can include a steady state detector configured to automatically identify the steady state for the operation of the corresponding device and associate monitored variables with steady or transient state. Each instance of predictive diagnostic system 502 can use only the monitored variables associated with the steady state, but not use the monitored variables associated with the transient state, for detecting, diagnosing, and/or predicting the operation of the corresponding device. The controller can be configured to use the detection, diagnosis, and/or prediction of each instance of predictive diagnostics system 502 to adjust an operation of the HVAC device.

In some embodiments, each instance of predictive diagnostics system 502 is configured to detect the steady state for the operation of a particular device of connected equipment 610. For example, the instance of predictive diagnostics system 502 within chillers 612 can detect the steady state for the operation of chillers 612, whereas the instance of predictive diagnostics system 502 within AHUs 614 can detect the steady state for the operation of AHUs 614. Each instance of predictive diagnostics system 502 can associate monitored variables of the corresponding device of connected equipment 610 with steady or transient state. Each instance of predictive diagnostics system 502 can use monitored variables associated with steady state but not use monitored variables associated with transient state for the corresponding device of connected equipment 610 to detect, diagnose, and/or predict faults, as previously described.

Connected equipment 610 can provide predicted faults, monitored variables identified as being associated with steady state or transient state, and/or equipment status information to network control engine 608. In some embodiments, the monitored variables, the detected state (i.e., steady state or transient state) and the equipment status information are provided to network control engine 608 as data points. Each data point can include a point ID and a point value. The point ID can identify the type of data point or a variable measured by the data point (e.g., condenser pressure, refrigerant temperature, fault code). Monitored variables can be identified by name or by an alphanumeric code (e.g., Chilled_Water_Temp, 7694, etc.). The point value can include an alphanumeric value indicating the current value of the data point (e.g., 44° F., fault code 4, etc.). The point value can further include an indication that the variables are associated with a steady state or a transient state (e.g., flag=1 for steady state, flag=0 for transient state). In other embodiments, the monitored variables and status information are not provided to network control engine 608, but rather are analyzed locally by the instances of predictive diagnostics system 502 within the connected equipment 610.

Network control engine 608 can broadcast the monitored variables, the detected state (i.e., steady state or transient state) and the equipment status information to remote operations center (ROC) 602. ROC 602 can provide remote monitoring services and can send an alert to client devices 448 and/or service technicians 606 in the event of a critical alarm. For example, ROC 602 can forward some or all of the predicted faults to client devices 448 and/or service technicians 606. In some embodiments, ROC 602 performs fault suppression or filtering and forwards only a subset of the most important or critical predicted faults to client devices 448 and/or service technicians 602. ROC 602 can push the monitored variables and equipment status information to a reporting database 604, where the data can be stored for reporting and analysis.

Connected Equipment Example: Centrifugal Chiller

Figure 6C:
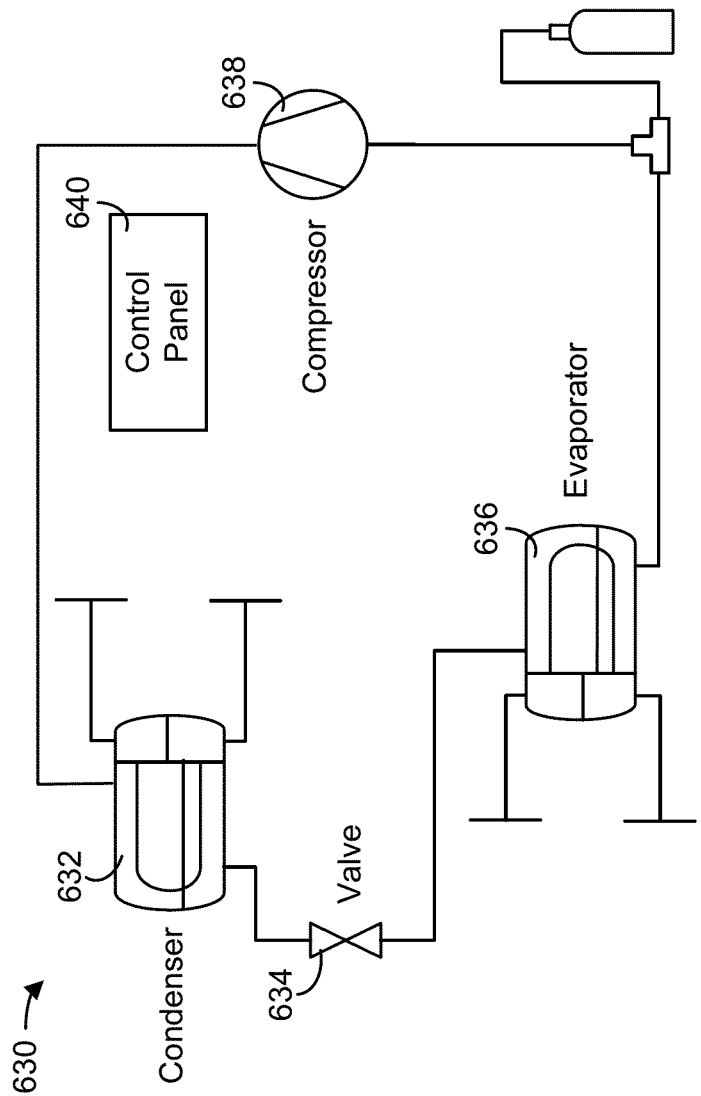
FIG. 6C is a schematic diagram of a chiller, which is an example of a type of connected equipment which can report monitored variables and status information to the predictive diagnostics system, according to some embodiments.

Referring now to FIG. 6C, a schematic diagram of a centrifugal chiller 630 is shown, according to some embodiments. Chiller 630 is an example of a type of connected equipment 610 which can report monitored variables and status information to predictive diagnostics system 502. Chiller 630 is shown to include a refrigeration circuit having a condenser 632, an expansion valve 634, an evaporator 636, a compressor 638, and a control panel 640. In some embodiments, chiller 630 includes sensors that measure a set of monitored variables at various locations along the refrigeration circuit. Table 1 below describes an exemplary set of monitored variables that can be measured in chiller 630. Predictive diagnostics system 502 can use these or other variables to detect the current operating state of chiller 630 and predict faults.

TABLE 1

Monitored Chiller Variables

| Number | ID | Description | Units |
|---|---|---|---|
| 1 | $F_{cw}$ | Condenser water flow rate | kg/s |
| 2 | $F_r$ | Refrigerant charge | kg |
| 3 | $F_{ew}$ | Evaporator water flow rate | kg/s |
| 4 | $T_{cir}$ | Condenser inlet refrigerant temperature | K |
| 5 | $A_v$ | Valve position | m$^2$ |
| 6 | $P_e$ | Evaporator pressure | Pa |
| 7 | $P_c$ | Condenser pressure | Pa |
| 8 | $W_{com}$ | Compressor power | Watts |
| 9 | $T_{eow}$ | Evaporator outlet water temperature | K |
| 10 | $T_{cow}$ | Condenser outlet water temperature | K |
| 11 | $T_{eiw}$ | Evaporator inlet water temperature | K |

TABLE 1-continued

Monitored Chiller Variables

| Number | ID | Description | Units |
|---|---|---|---|
| 12 | $T_{ciw}$ | Condenser inlet water temperature | K |
| 13 | $T_{eor}$ | Evaporator outlet refrigerant temperature | K |
| 14 | $T_{cor}$ | Condenser outlet refrigerant temperature | K |
| 15 | $T_{eir}$ | Evaporator inlet refrigerant temperature | K |

Chiller 630 can be configured to operate in multiple different operating states. For example, chiller 630 can be operated in a low load state, a medium load state, and a high load state. These three states represent the normal operating states or conditions of chiller 630. The evaporator inlet water temperature $T_{eiw}$ can be different in the normal operating states. For example, the value for $T_{eiw}$ may have a first value in the low load state (e.g., 280K), a second value in the medium load state (e.g., 282K), and a third value in the high load state (e.g., 284K).

Faults in chiller 630 may cause the operation of chiller 630 to deviate from the normal operating states. For example, three types of faults may occur in each of the normal operating states. These correspond to leaks in the condenser water flow $F_{cw}$, the evaporator water flow $F_{ew}$, and the refrigerant charge $F_r$. For each type of fault, several different fault levels may exist. For example, the fault levels may correspond to reductions in the values of the affected flow variables by 10%, 20%, 30%, and 40%. The combination of the three normal chiller load states, the three fault types for each normal load state, and the four fault levels for each fault type leads to a total of 39 operating states. Table 2 illustrates these operating states.

TABLE 2

Chiller Operating States

| | Load | | | | Leak Percent | | |
|---|---|---|---|---|---|---|---|
| | Low | Medium | High | | | | |
| | State ID | | | Type | $F_{cw}$ | $F_r$ | $F_{ew}$ |
| | 1 | 14 | 27 | Normal | 0 | 0 | 0 |
| | 2 | 15 | 28 | | 10 | | |
| | 3 | 16 | 29 | | 20 | 0 | |
| | 4 | 17 | 30 | | 30 | | |
| | 5 | 18 | 31 | | 40 | | 0 |
| | 6 | 19 | 32 | | | 10 | |
| | 7 | 20 | 33 | Faulty | | 20 | |
| | 8 | 21 | 34 | | | 30 | |
| | 9 | 22 | 35 | | 0 | 40 | |
| | 10 | 23 | 36 | | | | 10 |
| | 11 | 24 | 37 | | | 0 | 20 |
| | 12 | 25 | 38 | | | | 30 |
| | 13 | 26 | 39 | | | | 40 |

Predictive diagnostics system 502 may collect samples of the monitored variables, associate the monitored variables with steady state or transient state, and use the monitored variables associated with steady state to build models (e.g., PCA models) of the operating states of the chiller. For example, predictive diagnostics system 502 may collect 1000 samples of the monitored variables at a rate of one sample per second. The samples taken at each sampling time can be organized into a vector, as shown in the following equation:

$$x = [F_{cw} F_r \ldots T_{eir}]^T$$

The samples x of monitored variables can be passed to a steady state detector, a modeler (e.g., PCA modeler), and/or other components of predictive diagnostics system 502 and be used to determine whether a specific sample x reflects the operation in steady state or transient state. Predictive diagnostics system 502 can use the samples x reflecting operation in steady state, but not use the samples x reflecting operation in transient state, to construct models for operating states and to predict when a fault will occur.

Predictive Diagnostics System

Figure 7:
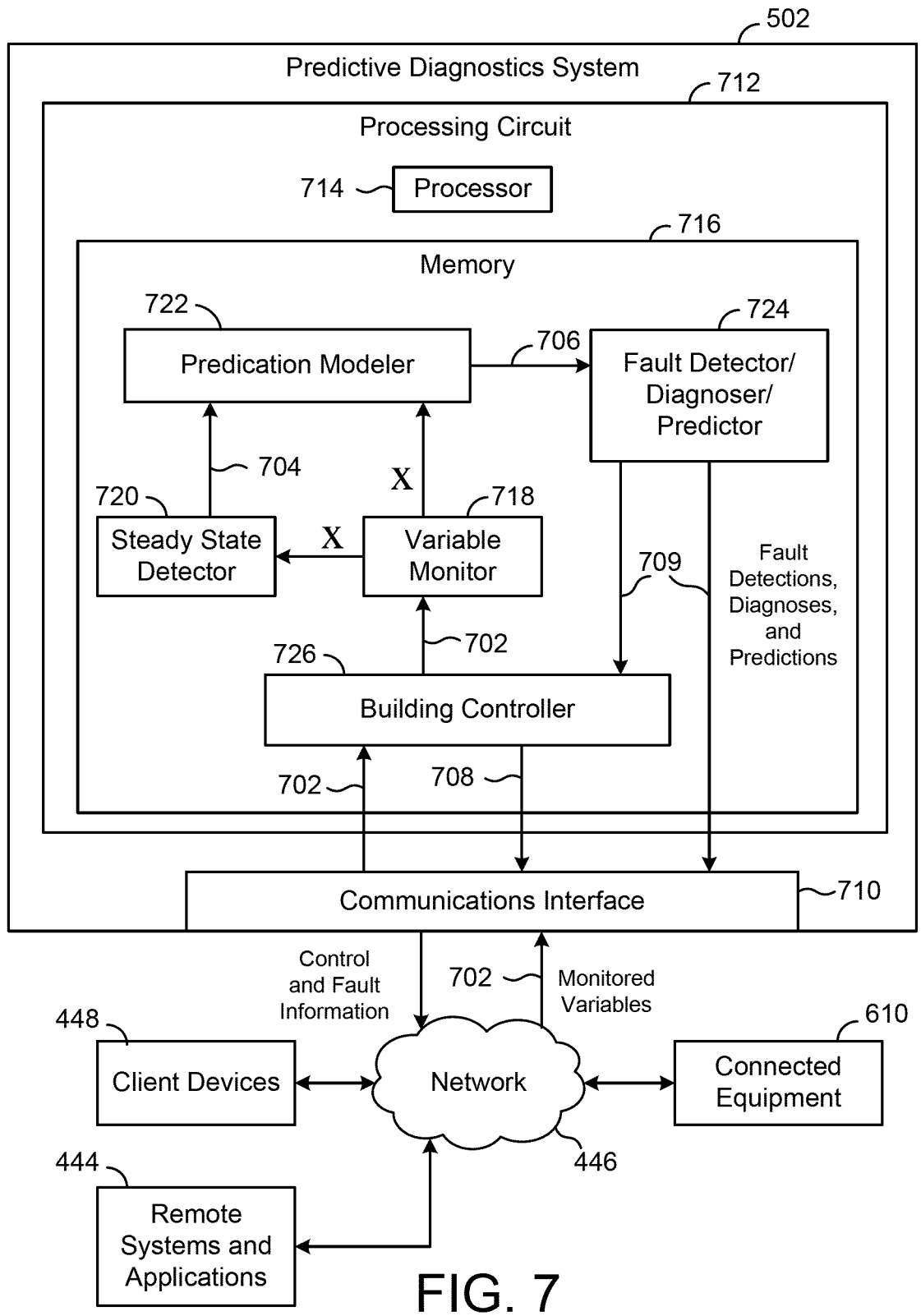
FIG. 7 is a block diagram illustrating the predictive diagnostics system in greater detail, according to some embodiments.

Referring now to FIG. 7, a block diagram illustrating predictive diagnostics system 502 in greater detail is shown, according to some embodiments. Predictive diagnostics system 502 is shown to include a communications interface 710 and a processing circuit 712. Communications interface 710 may facilitate communications between predictive diagnostics system 502 and various external systems or devices. For example, predictive diagnostics system 502 may receive the monitored variables from connected equipment 610 and provide control signals to connected equipment 610 via communications interface 710. Communications interface 710 may also be used to communicate with remote systems and applications 444, client devices 448, and/or any other external system or device. For example, predictive diagnostics system 502 may provide fault detections, diagnoses, and/or predictions to remote systems and applications 444, client devices 448, service technicians 606, or any other external system or device via communications interface 710.

Communications interface 710 can include any number and/or type of wired or wireless communications interfaces (e.g., jacks, antennas, transmitters, receivers, transceivers, wire terminals, etc.). For example, communications interface 710 can include an Ethernet card and port for sending and receiving data via an Ethernet-based communications link or network. As another example, communications interface 710 can include a WiFi transceiver, a NFC transceiver, a cellular transceiver, a mobile phone transceiver, or the like for communicating via a wireless communications network. In some embodiments, communications interface 710 includes RS232 and/or RS485 circuitry for communicating with BMS devices (e.g., chillers, controllers, etc.). Communications interface 710 can be configured to use any of a variety of communications protocols (e.g., BACNet, Modbus, N2, MSTP, Zigbee, etc.). Communications via interface 710 can be direct (e.g., local wired or wireless communications) or via an intermediate communications network 446 (e.g., a WAN, the Internet, a cellular network, etc.). Communications interface 710 can be communicably connected with processing circuit 712 such that processing circuit 712 and the various components thereof can send and receive data via communications interface 710.

Processing circuit 712 is shown to include a processor 714 and memory 716. Processor 714 can be implemented as a general purpose processor, an application specific integrated circuit (ASIC), one or more field programmable gate arrays (FPGAs), a group of processing components, or other suitable electronic processing components. Memory 716 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 716 can be or include volatile memory or non-volatile memory.

Memory 716 can include database components, object code components, script components, or any other type of information structure for supporting the various activities and information structures described in the present application. According to some embodiments, memory 716 is communicably connected to processor 714 via processing circuit 712 and includes computer code for executing (e.g., by processing circuit 712 and/or processor 714) one or more processes described herein.

Still referring to FIG. 7, memory 716 is shown to include a variable monitor 718. Variable monitor 718 can be configured to monitor one or more variables (i.e., monitored variables 702) that indicate the performance of connected equipment 610. For example, monitored variables 702 can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing. The monitored variables 702 can be received from connected equipment 610 and/or from various devices thereof. For example, the monitored variables 702 can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices within building subsystems 428.

In some embodiments, the monitored variables 702 include n different time-series variables. Variable monitor 718 may gather measurements or other values (e.g., calculated or estimated values) of the n time-series variables in a sample vector x, where $x \in \Re^n$. Variable monitor 718 can be configured to collect m samples of each of the n time-series variables.

Still referring to FIG. 7, memory 716 is shown to include a steady state detector 720. Steady state detector 720 is shown receiving the sample vectors x from variable monitor 718. Steady state detector 720 can be configured to determine whether a specific sample vector x reflects operation under a steady state or a transient state of connected equipment 610. As used herein, a steady state refers to a state in which the monitored variables are substantially unchanging or changing very slightly in time. A transient state refers to a state in which the monitored variables are changing considerably in time and have not reached the steady state. Steady state detector 720 can be configured to associate each sample vector x with either steady state or transient state. For example, steady state detector 720 can be configured to attach a one-bit flag to each sample vector x, where the flag with a value of 1 indicates steady state and the flag with a value of 0 indicates transient state.

In some embodiments, steady state detector 720 can be configured to maintain an indicator of current state for the operation of connected equipment 610. As used herein, current state refers to the steady state or transient state determined for the latest sample vector x. For example, if steady state detector 720 determines that the latest sample vector x reflects operation under the steady state, the current state then is steady state. If steady state detector 720 determines that the latest sample vector x reflects operation under the transient state, the current state then is transient state. Steady state detector 720 can be configured to maintain a one-bit flag as the current state indicator, where the flag with a value of 1 indicates current state is steady and the flag with a value of 0 indicates current state is transient. Steady state detector 720 can be configured to update the current state indicator every time a determination is made for a new sample vector x.

Still referring to FIG. 7, memory 716 is shown to include a prediction modeler 722. Prediction modeler 722 can be configured to construct a model for predicting the performance of connected equipment 610 based on the monitored variables 702 and detected state (i.e., steady state or transient state). Prediction modeler 722 can be configured to use only monitored variables associated with steady state, but not use monitored variables associated with transient state to construct the prediction model. In some embodiments, prediction modeler 722 receives a sample vector x from variable monitor 718 and a flag 704 indicating the steady or transient state associated with the sample vector x from steady state detector 720. In other embodiments, prediction modeler 722 receives sample vectors x each attached with a flag 704 indicating the associated steady or transient state from steady state detector 720. If the flag indicates that a particular sample vector x reflects steady state, prediction modeler 722 then uses that sample vector x in constructing the prediction model. If the flag indicates that a particular sample vector x reflects transient state, prediction modeler 722 then does not use that sample vector x in constructing the prediction model. In yet other embodiments, steady state detector 720 is integrated into prediction modeler 722.

The model used by prediction modeler 722 for predicting the performance of connected equipment 610 may include, for example, one or more first principle models (e.g., Gordon-Ng model), one or more regression models (e.g., Bi-Quadratic 9 Parameter model), one or more principal component analysis (PCA) models, one or more partial least squares (PLS) models, etc. An example PCA modeler is described in detail in U.S. patent application Ser. No. 15/279,336 filed Sep. 28, 2016.

Still referring to FIG. 7, memory 716 is shown to include a fault detector/diagnoser/predictor 724. Fault detector/diagnoser/predictor 724 is shown receiving the constructed prediction model 706 from prediction modeler 722. Fault detector/diagnoser/predictor 724 can be configured to detect, diagnose, and/or predict any fault for connected equipment 610 based on the prediction model 706. Fault detector/diagnoser/predictor 724 can be configured to compare the prediction model 706 with stored list, look-up table, library, etc. to determine whether there is any fault detection, diagnosis, and/or prediction. If a fault is detected, diagnosed, and/or predicted, the fault detection, diagnosis, and/or prediction 709 can be stored in memory 716 and/or communicated to client device 448, remote systems and applications 444, building subsystems 428, or any other external system or device. In some embodiments, the fault detection, diagnosis, and/or prediction 709 may identify a particular fault, a particular device of connected equipment 610 in which the fault is identified, recommended actions to repair connected equipment 610, and/or estimated time at which a predicted fault is estimated to occur. In some embodiments, the fault detection, diagnosis, and/or prediction 709 is provided to building controller 726. Building controller 726 can use the information to perform an automated control action. An example fault detector, diagnoser, and predictor are described in detail in U.S. patent application Ser. No. 15/279,336 filed Sep. 28, 2016.

Still referring to FIG. 7, memory 716 is shown to include a building controller 726. Building controller 726 can be configured to control one or more buildings, building systems, or building subsystems. For example, building controller 726 may utilize closed loop control, feedback control, PI control, model predictive control, or any other type of automated building control methodology to generate control signals for the connected equipment 610. In some embodiments, building controller 726 uses the fault detection, diagnose, and/or prediction 709 to determine an appropriate control signal 708 for the connected equipment 610. In other words, the control signals generated by building controller 726 can be based on the current operating state, as determined by fault detector/diagnoser/predictor 724. For example, building controller 726 can use the fault prediction to perform automated control actions to prevent the predicted faults from occurring. In particular, building controller 726 can automatically cause connected equipment 610 to enter a safety mode or shut down when a fault is predicted to occur (e.g., by providing a control signal 708 to connected equipment 610).

In some embodiments, building controller 726 controls connected equipment 610 using an automated staging algorithm. For example, connected equipment 610 can include array of chillers which can be staged automatically to accommodate varying loads. In response to a predicted fault in a particular chiller, building controller 726 can remove the chiller from the array of chillers in the control algorithm so that the automatic staging does not include the chiller for which the fault is predicted. This allows the chiller to be taken offline for maintenance without affecting the performance of the staging algorithm.

In some embodiments, building controller 726 automatically compensates for the fault before the fault occurs. For example, building controller 726 can identify a decrease in performance or efficiency estimated to result from the predicted fault. Building controller 726 can automatically adjust the efficiency or expected performance of the connected equipment in an automated control algorithm that uses the efficiency or expected performance to determine an appropriate control signal for the connected equipment. For example, if the predicted fault is expected to reduce chiller output by 25%, building controller 726 can automatically increase the control signal provided to the chiller by 25% to preemptively compensate for the expected decrease in performance. If the predicted fault is expected to increase chilled water temperature by a predetermined number of degrees, building controller 726 can automatically reduce the chilled water setpoint by the predetermined number of degrees so that the actual chilled water temperature will remain at the desired temperature.

Building controller 726 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via communications interface 710. In some embodiments, building controller 726 receives samples of the monitored variables. Building controller 726 may apply the monitored variables and/or other inputs to a control algorithm or model (e.g., a building energy use model) to determine an output for one or more building control devices (e.g., dampers, air handling units, chillers, boilers, fans, pumps, etc.) in order to affect a variable state or condition within the building (e.g., zone temperature, humidity, air flow rate, etc.). Building controller 726 may operate the building control devices to maintain building conditions within a setpoint range, to optimize energy performance (e.g., to minimize energy consumption, to minimize energy cost, etc.), and/or to satisfy any constraint or combination of constraints as can be desirable for various implementations.

Steady State Detector

Figure 8:
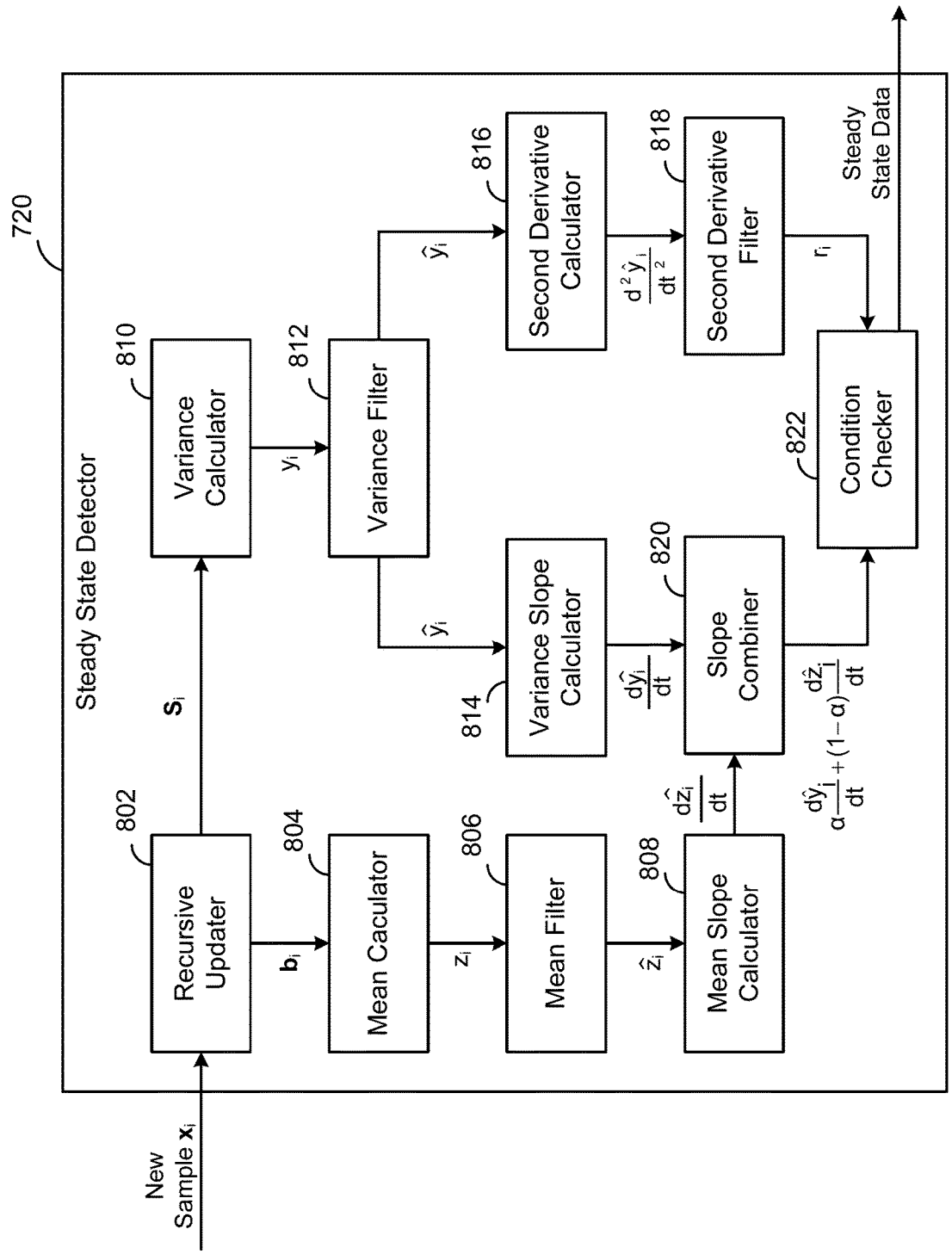
FIG. 8 is a block diagram illustrating the steady state detector of FIG. 7 in greater detail, according to some embodiments.

Referring now to FIG. 8, a block diagram illustrating steady state detector 720 in greater detail is shown, according to an exemplary embodiment. Steady state detector 720 can be configured to determine whether a specific sample vector x reflects operation under a steady state or a transient state of connected equipment 610. As discussed above with reference to FIG. 7, variable monitor 718 may gather measurements or other values (e.g., calculated or estimated values) of n time-series variables associated with operation of connected equipment 610 at each sample time. The n samples taken at each sample time can be organized into a sample vector x, where $x \in \mathcal{R}^n$. As an example, a sample vector x for a chiller (as a device of connected equipment 610) may be:

$$x = [W_c P_c P_e T_{cw} T_{rw}]^T \quad (1),$$

where $W_c$ represents the compressor power of the chiller, $P_c$ represents the condenser pressure, $P_e$ represents the evaporator pressure, $T_{cw}$ represents the chilled water temperature, and $T_{rw}$ represents the return water temperature.

Steady state detector 720 is shown to include a recursive updater 802. Recursive updater 802 is shown receiving new sample vector $x_i$ of the monitored variables from, for example, variable monitor 718, as described with reference to FIG. 7. The subscript i indicates that the new sample vector $x_i$ is the ith sample vector in a set of sample vectors, which is taken at the sample time t=i. Recursive updater 802 can recursively update a mean vector b and a covariance matrix S every time a new sample vector $x_i$ is collected. The mean vector b and the covariance matrix S are defined as follows:

$$b_i = \frac{1}{i} \sum_{j=1}^{i} x_j, \quad (2)$$

$$S_i = \frac{1}{i} \sum_{j=1}^{i} (x_j - b_j)(x_j - b_j)^T = \frac{1}{i} \sum_{j=1}^{i} x_j x_j^T - b_j b_j^T. \quad (3)$$

where $b_i$ is the mean vector of the set of i samples after adding the new sample $x_i$, and $S_i$ is the covariance matrix of the set of i samples after adding the new sample $x_i$. Variances of the monitored variables are represented by the diagonal elements of the covariance matrix S.

Recursive updater 802 can use the following equations to recursively update the mean vector b and the covariance matrix S each time a new sample $x_i$ of the monitored variables is received:

$$b_i = b_{i-1} + \frac{1}{\min(i, K)} [x_i - b_{i-1}], \quad (4)$$

$$S_i = S_{i-1} + b_{i-1} b_{i-1}^T - b_i b_i^T + \frac{1}{\min(i, K)} [x_i x_i^T - S_{i-1} - b_{i-1} b_{i-1}^T], \quad (5)$$

where $b_{i-1}$ is the mean vector of the previous set of i−1 samples before adding the new sample $x_i$, $S_{i-1}$ is the covariance matrix of the previous set of i−1 samples before adding the new sample $x_i$, and K gives previous samples exponentially decreased weight. In some embodiments, K is defined as follows:

$$K = \frac{\tau_p}{h}, \quad (6)$$

where $\tau_p$ is a time constant, and h is a sample rate of the BMS (e.g., a rate at which samples x are collected). In some embodiments, $\tau_p$ is an empirical time constant. Some empirical time constants $\tau_p$ are pre-determined and may be readily available for variables monitored in typical HVAC processes. In other embodiments, a test can be performed to estimate the time constant $\tau_p$ if not readily available. If the monitored variables have different time constants $\tau_p$, the largest time constant $\tau_p$ can be used in equation (6).

Equations (4) and (5) for the mean vector $b_i$ and the covariance matrix $S_i$ can be derived as follows. Given a set of i samples $x_j$ (i.e., j=1 . . . i), the mean vector $b_i$ and the covariance matrix $S_i$ can be calculated as:

$$b_i = \frac{1}{i}\sum_{j=1}^{i} x_j,$$

$$S_i = \frac{1}{i}\sum_{j=1}^{i}(x_j - b_i)(x_j - b_i)^T = \frac{1}{i}\sum_{j=1}^{i} x_j x_j^T - b_i b_i^T.$$

From the above equations, the vector sums are equivalent to:

$$\sum_{j=1}^{i} x_j = ib_i,$$

$$\sum_{j=1}^{i} x_j x_j^T = i(S_i + b_i b_i^T).$$

Expanding the calculation of the mean $b_i$ and substituting the summation of the first i−1 terms yields the recursive equation:

$$b_i = \frac{1}{i}\left[\sum_{j=1}^{i-1} x_j + x_i\right]$$

$$= \frac{1}{i}[(i-1)b_{i-1} + x_i]$$

$$= b_{i-1} + \frac{1}{i}[x_i - b_{i-1}].$$

Similarly, expanding the calculation of the covariance matrix $S_i$ and substituting the summation of the first i−1 terms yields the recursive equation:

$$S_i = \frac{1}{i}\left[\sum_{j=1}^{i-1} x_j x_j^T + x_i x_i^T\right] - b_i b_i^T$$

$$= \frac{1}{i}[(i-1)(S_{i-1} + b_{i-1}b_{i-1}^T) + x_i x_i^T] - b_i b_i^T$$

$$= S_{i-1} + b_{i-1}b_{i-1}^T - b_i b_i^T + \frac{1}{i}[x_i x_i^T - S_{i-1} - b_{i-1}b_{i-1}^T].$$

The variable i can then be replaced with the function min (i, K) to obtain the expressions (4) and (5) for the vector mean $b_i$ and the covariance matrix $S_i$. That is to say, if the total number i of available samples is less than the value specified by the parameter K, the lesser value i will be used as a result of the min ( ) function. The value i acts as a weight of the new inputs and past values upon update. If the total number i of available samples is greater than the value specified by the parameter K, the fixed value K will be used as a result of the min ( ) function. A small value of K would give more weight to recent samples, whereas a large value of K would give less weight to recent samples. This is similar to an exponentially-weighted moving average (EWMA) calculation of the mean vector $b_i$ and the covariance matrix $S_i$. The value of the parameter K can be retrieved from memory, adaptively determined by system 502 or an external system or device, specified by a user, or received from any other data source.

Still referring to FIG. 8, steady state detector 720 is shown to include a mean calculator 804. Mean calculator 804 can receive the recursively updated values of the vector mean $b_i$ from recursive updater 802. Mean calculator 804 can use the values of the vector mean $b_i$ to calculate an average mean $z_i$ of the variables. In some embodiments, mean calculator 804 calculates the average mean $z_i$ at time i as follows:

$$z_i = \frac{1}{n}b_i^T 1_n, \quad (7)$$

where n is the number of the monitored variables in the sample vector x, and $1_n=[1\ 1\ \ldots\ 1]^T$ is a vector with n values of 1. The average mean $z_i$ calculated according to equation (7) represents the average mean among all of the monitored variables.

Mean calculator 804 can calculate the average mean $z_i$ each time a new sample $x_i$ is collected. In some embodiments, mean calculator 804 stores the average mean $z_i$ along with a history of past average mean values. For example, mean calculator 804 can calculate and store the average mean of the first i−1 samples as $z_{i-1}$ (e.g., $$z_{i-1} = \frac{1}{n}b_{i-1}^T 1_n).$$

similarly, mean calculator 804 can calculate and store the average mean of the first i−2 samples as $z_{i-2}$ (e.g., $$z_{i-2} = \frac{1}{n}b_{i-2}^T 1_n),$$

and so on. Mean calculator 804 can provide the average mean $z_i$ and the other average mean values to mean filter 806. In some embodiments, mean calculator 804 provides the average mean values as a time series of average mean values, where each element of the time series corresponds to the average mean calculated at a particular time. For example, the average mean $z_i$ can be calculated a time t, whereas the average mean $z_{i-1}$ can be calculated at time t−1, and so on.

Mean filter 806 can filter time series of average mean values to generate a filtered mean $\hat{z}_i$. In some embodiments, mean filter 806 calculates the filtered mean $\hat{z}_i$ as an average of a predetermined number R of the average mean values in the time series. For example, mean filter 806 can calculate an average of the R most recent average mean values using the following equation:

$$\hat{z}_i = \frac{1}{R}\sum_{j=0}^{R-1} z_{i-j} \qquad (8)$$

where R is an integer defining the number of average mean values to include. In an example, R=7, equation (8) becomes:

$$\hat{z}_i = \frac{1}{7}\sum_{j=0}^{6} z_{i-j}. \qquad (8')$$

In other embodiments, mean filter 806 can filter the time series of average mean values using any other filter or equation (e.g., a weighted average, an exponentially-weighted moving average, etc.) or can be omitted entirely.

Mean filter 806 can calculate the filtered mean $\hat{z}_i$ each time a new sample $x_i$ is collected. In some embodiments, mean filter 806 stores the filtered mean $\hat{z}_i$ along with a history of past filtered mean values. For example, mean filter 806 can calculate and store the filtered mean of the first i−1 samples as $\hat{z}_{i-1}$ (e.g., $$\hat{z}_{i-1} = \frac{1}{R}\sum_{j=0}^{R-1} z_{i-1-j}).$$

Similarly, mean filter 806 can calculate and store the filtered mean of the first i−2 samples as $\hat{z}_{i-2}$ (e.g., $$\hat{z}_{i-2} = \frac{1}{R}\sum_{j=0}^{R-1} z_{i-2-j}),$$

and so on. Mean filter 806 can provide the filtered mean $\hat{z}_i$ and the other filtered mean values to mean slope calculator 808. In some embodiments, mean filter 806 provides the filtered mean values as a time series of filtered mean values, where each element of the time series corresponds to the filtered mean calculated at a particular time. For example, the filtered mean $\hat{z}_i$ can be calculated a time t, whereas the filtered mean $\hat{z}_{i-1}$ can be calculated at time t−1, and so on.

Still referring to FIG. 8, steady state detector 720 is shown to include a mean slope calculator 808. Mean slope calculator 808 can be configured to calculate a rate at which the filtered mean $\hat{z}_i$ is changing as a function of time. Mean slope calculator 808 can use any of a variety of techniques to calculate the rate of change of the filtered mean $\hat{z}_i$. For example, mean slope calculator 808 can find the slope of a line tangent to a curve fit to a set of filtered mean values, calculate the derivative of a function $\hat{z}_i(t)$ representing the time series of filtered mean values, or otherwise determine the rate at which the filtered mean $\hat{z}_i$ is changing as a function of time.

In some embodiments, mean slope calculator 808 fits a curve to the time series of filtered mean values and calculates the slope of a line tangent to the curve. For example, mean slope calculator 808 can fit a parabola that passes through a predetermined number of the filtered mean values (e.g., five filtered mean values, seven filtered mean values, nine filtered mean values, etc.). Mean slope calculator 808 can select a point on the curve and find the slope of a tangent line that passes through the selected point. In some embodiments, mean slope calculator 808 selects the middle point in the predetermined number of filtered mean values. For example, if the curve is a parabola fit to a set of seven filtered mean values, mean slope calculator 808 can find the slope of a tangent line that passes through the third filtered mean point used to generate the parabola. Mean slope calculator 808 can calculate the slope of the tangent line using the following equation (i.e., the 7-point Golay filter):

$$\frac{d\hat{z}_i}{dt} = \frac{1}{28h}(3\hat{z}_i + 2\hat{z}_{i-1} + \hat{z}_{i-2} - \hat{z}_{i-4} - 2\hat{z}_{i-5} - 3\hat{z}_{i-6}), \qquad (9)$$

where $$\frac{d\hat{z}_i}{dt}$$

is the slope of the tangent line that passes through the third filtered variance point $\hat{z}_{i-3}$, and h is the sample rate of the monitored variables.

In some embodiments, mean slope calculator 808 uses the set of unfiltered average mean values (i.e., $\{z_1, z_2, \ldots z_{i-1}, z_i\}$) rather than the set of filtered mean values to calculate a rate at which the average mean $z_i$ is changing as a function of time. Variance slope calculator 2210 can use any of a variety of techniques to calculate the rate of change of the average mean $z_i$. For example, mean slope calculator 808 can find the slope of a line tangent to a curve fit to a set of mean values, calculate the derivative of a function $z_i(t)$ representing the time series of average mean values, or otherwise determine the rate at which the average mean $z_i$ is changing as a function of time (e.g., $$\frac{dz}{dt}).$$

Mean slope calculator 808 can use any of the techniques described above to calculate and update $$\frac{dz}{dt}$$

each time a new sample x of the monitored variables is received.

Still referring to FIG. 8, steady state detector 720 is shown to include a variance calculator 810. Variance calculator 810 can receive the recursively updated values of the covariance matrix $S_i$ from recursive updater 802. Variance calculator 810 can use the values of the covariance matrix $S_i$ to calculate an average variance $y_i$. In some embodiments, variance calculator 810 calculates the average variance $y_i$ as the trace of the covariance matrix $S_i$ divided by the number of variables n, as shown in the following equation:

$$y_i = \frac{1}{n}tr\{S_i\}, \qquad (10)$$

where tr{ } is the trace operator, and n is the number of monitored variables in the sample vector x. This results in an average variance $y_i$ representing the average variance among all of the monitored variables.

Variance calculator 810 can calculate the average variance $y_i$ each time a new sample $x_i$ is collected. In some embodiments, variance calculator 810 stores the average variance $y_i$ along with a history of past average variance values. For example, variance calculator 810 can calculate and store the average variance of the first i−1 samples as (e.g., $$y_{i-1} = \frac{1}{n}tr\{S_{i-1}\}).$$

Similarly, variance calculator 2204 can calculate and store the average variance of the first i−2 samples as $y_{i-2}$ (e.g., $$y_{i-2} = \frac{1}{n}tr\{S_{i-2}\}),$$

and so on. Variance calculator 810 can provide the average variance $y_i$ and the other average variance values to variance filter 812. In some embodiments, variance calculator 810 provides the average variance values as a time series of average variance values, where each element of the time series corresponds to the average variance calculated at a particular time. For example, the average variance $y_i$ can be calculated a time t, whereas the average variance $y_{i-1}$ can be calculated at time t−1, and so on.

Variance filter 812 can filter time series of average variance values to generate a filtered variance $\hat{y}_i$. In some embodiments, variance filter 2206 calculates the filtered variance $\hat{y}_i$ as an average of a predetermined number R of the average variance values in the time series. For example, variance filter 812 can calculate an average of the R most recent variance values using the following equation:

$$\hat{y}_i = \frac{1}{R}\sum_{j=0}^{R-1}y_{i-j} \quad (11)$$

where R is an integer defining the number of variance values to include in the average. In an example, R=7, equation (11) becomes:

$$\hat{y}_i = \frac{1}{R}\sum_{j=0}^{6}y_{i-j} \quad (11')$$

In other embodiments, variance filter 812 can filter the time series of average variance values using any other filter or equation (e.g., a weighted average, an exponentially-weighted moving average, etc.) or can be omitted entirely.

Variance filter 812 can calculate the filtered variance $\hat{y}_i$ each time a new sample $x_i$ is collected. In some embodiments, variance filter 812 stores the filtered variance $\hat{y}_i$ along with a history of past filtered variance values. For example, variance filter 812 can calculate and store the filtered variance of the first i−1 samples as $\hat{y}_{i-1}$ (e.g., $$\hat{y}_{i-1} = \frac{1}{R}\sum_{j=0}^{R-1}y_{i-1-j}).$$

Similarly, variance filter 812 can calculate and store the filtered variance of the first i−2 samples as $\hat{y}_{i-2}$ (e.g., $$\hat{y}_{i-2} = \frac{1}{R}\sum_{j=0}^{R-1}y_{i-2-j}),$$

and so on. Variance filter 812 can provide the filtered variance $\hat{y}_i$ and the other filtered variance values to variance slope calculator 814. In some embodiments, variance filter 812 provides the filtered variance values as a time series of filtered variance values, where each element of the time series corresponds to the filtered variance calculated at a particular time. For example, the filtered variance $\hat{y}_i$ can be calculated a time t, whereas the filtered variance $\hat{y}_{i-1}$ can be calculated at time t−1, and so on.

Still referring to FIG. 8, steady state detector 727 is shown to include a variance slope calculator 814. Variance slope calculator 814 can be configured to calculate a rate at which the filtered variance $\hat{y}_i$ is changing as a function of time. Variance slope calculator 814 can use any of a variety of techniques to calculate the rate of change of the filtered variance $\hat{y}_i$. For example, variance slope calculator 814 can find the slope of a line tangent to a curve fit to a set of filtered variance values, calculate the derivative of a function $\hat{y}_i(t)$ representing the time series of filtered variance values, or otherwise determine the rate at which the filtered variance $\hat{y}_i$ is changing as a function of time.

In some embodiments, variance slope calculator 814 fits a curve to the time series of filtered variance values and calculates the slope of a line tangent to the curve. For example, variance slope calculator 814 can fit a parabola that passes through a predetermined number of the filtered variance values (e.g., five filtered variance values, seven filtered variance values, nine filtered variance values, etc.). Variance slope calculator 814 can select a point on the curve and find the slope of a tangent line that passes through the selected point. In some embodiments, variance slope calculator 814 selects the middle point in the predetermined number of filtered variance values. For example, if the curve is a parabola fit to a set of seven filtered variance values, variance slope calculator 814 can find the slope of a tangent line that passes through the third filtered variance point used to generate the parabola. Variance slope calculator 814 can calculate the slope of the tangent line using the following equation (i.e., the 7-point Golay filter):

$$\frac{d\hat{y}_i}{dt} = \frac{1}{28h}(3\hat{y}_i + 2\hat{y}_{i-1} + \hat{y}_{i-2} - \hat{y}_{i-4} - 2\hat{y}_{i-5} - 3\hat{y}_{i-6}), \quad (12)$$

where $$\frac{d\hat{y}_i}{dt}$$

is the slope of the tangent line that passes through the third filtered variance point $\hat{y}_{i-3}$, and h is the sample rate of the variables.

In some embodiments, variance slope calculator 814 uses the set of unfiltered average variance values (i.e., $\{y_1, y_2, \ldots y_{i-1}, y_i\}$) rather than the set of filtered variance values to calculate a rate at which the average variance $y_i$ is changing as a function of time. Variance slope calculator 814 can use any of a variety of techniques to calculate the rate of change of the variance $y_i$. For example, variance slope calculator 814 can find the slope of a line tangent to a curve fit to a set of variance values, calculate the derivative of a function $y_i(t)$ representing the time series of variance values, or otherwise determine the rate at which the variance $y_i$ is changing as a function of time (e.g., $$\frac{dy}{dt}).$$

Variance slope calculator 814 can use any of the techniques described above to calculate and update $$\frac{dy}{dt}$$

each time a new sample x of the monitored variables is received.

Still referring to FIG. 8, steady state detector 720 is shown to include a second derivative calculator 816. Second derivative calculator 816 can be configured to calculate the second derivative for the filtered variance $\hat{y}_i$, (e.g., $$\frac{d^2\hat{y}}{dt^2}).$$

Second derivative calculator 816 can use any of a variety of techniques to calculate the second derivative for the filtered variance $\hat{y}_i$. For example, like variance slope calculator 814, second derivative calculator 816 can use a 7-point Golay filter to calculate the second derivative as follows:

$$\frac{d^2\hat{y}_i}{dt^2} = \frac{1}{42h^2}(5\hat{y}_i - 3\hat{y}_{i-2} - 4\hat{y}_{i-3} - 3\hat{y}_{i-4} + 5\hat{y}_{i-6}), \quad (13)$$

where $$\frac{d^2\hat{y}_i}{dt^2}$$

is second derivative for the filtered variance $y_i$, and h is the sample rate of the variables.

In some embodiments, second derivative calculator 816 uses the set of unfiltered variance values (i.e., $\{y_1, y_2 \ldots y_{i-1}, y_i\}$) rather than the set of filtered variance values to calculate the second derivative for the variance $y_i$. Second derivative calculator 816 can use any of a variety of techniques to calculate the second derivative of the variance $y_i$. Second derivative calculator 816 can use any of the techniques to calculate and update $$\frac{d^2 y_i}{dt^2}$$

each time a new sample x of the monitored variables is received.

Still referring to FIG. 8, steady state detector 720 is shown to include a second derivative filter 818. The second derivatives $$\frac{d^2\hat{y}_i}{dt^2}$$

calculated according to equation (13) may be noisy. Second derivative filter 818 can filter the second derivatives $$\frac{d^2\hat{y}_i}{dt^2}$$

to generate a filtered second derivative $r_i$. In some embodiments, in order to clean the signal, second derivative filter 818 filter the second derivative with an exponentially weighted moving average. For example, variance filter 812 can calculate filtered second derivative $r_i$ using the following equation:

$$r_i = r_{i-1} + \frac{1}{\min(i, K)}\left[\frac{d^2\hat{y}_i}{dt^2} - r_{i-1}\right], \quad (14)$$

where $r_{i-1}$ is the filtered second derivative of i−1 samples before adding the new sample $x_i$, and K gives previous samples exponentially decreased weight. In some embodiments, K is defined by equation (6) as discussed above, i.e., $$K = \frac{\tau_p}{h},$$

$\tau_p$ is a time constant, and h is a sample rate of the BMS system.

In equation (14), if the total number i of available samples is less than the value specified by the parameter K, the lesser value i will be used as a result of the min ( ) function. The value i acts as a weight of the new inputs and past values upon update. If the total number i of available samples is greater than the value specified by the parameter K, the fixed value K will be used as a result of the min ( ) function. A small value of K would give more weight to recent samples, whereas a large value of K would give less weight to recent samples. This is similar to an exponentially-weighted moving average (EWMA) calculation of the second derivatives $$\frac{d^2\hat{y}_i}{dt^2}.$$

The value of the parameter K can be retrieved from memory, adaptively determined by system 502 or an external system or device, specified by a user, or received from any other data source. Second derivative filter 818 can calculate the filtered second derivative $r_i$ each time a new sample x of the monitored variables is received.

Figure 9:
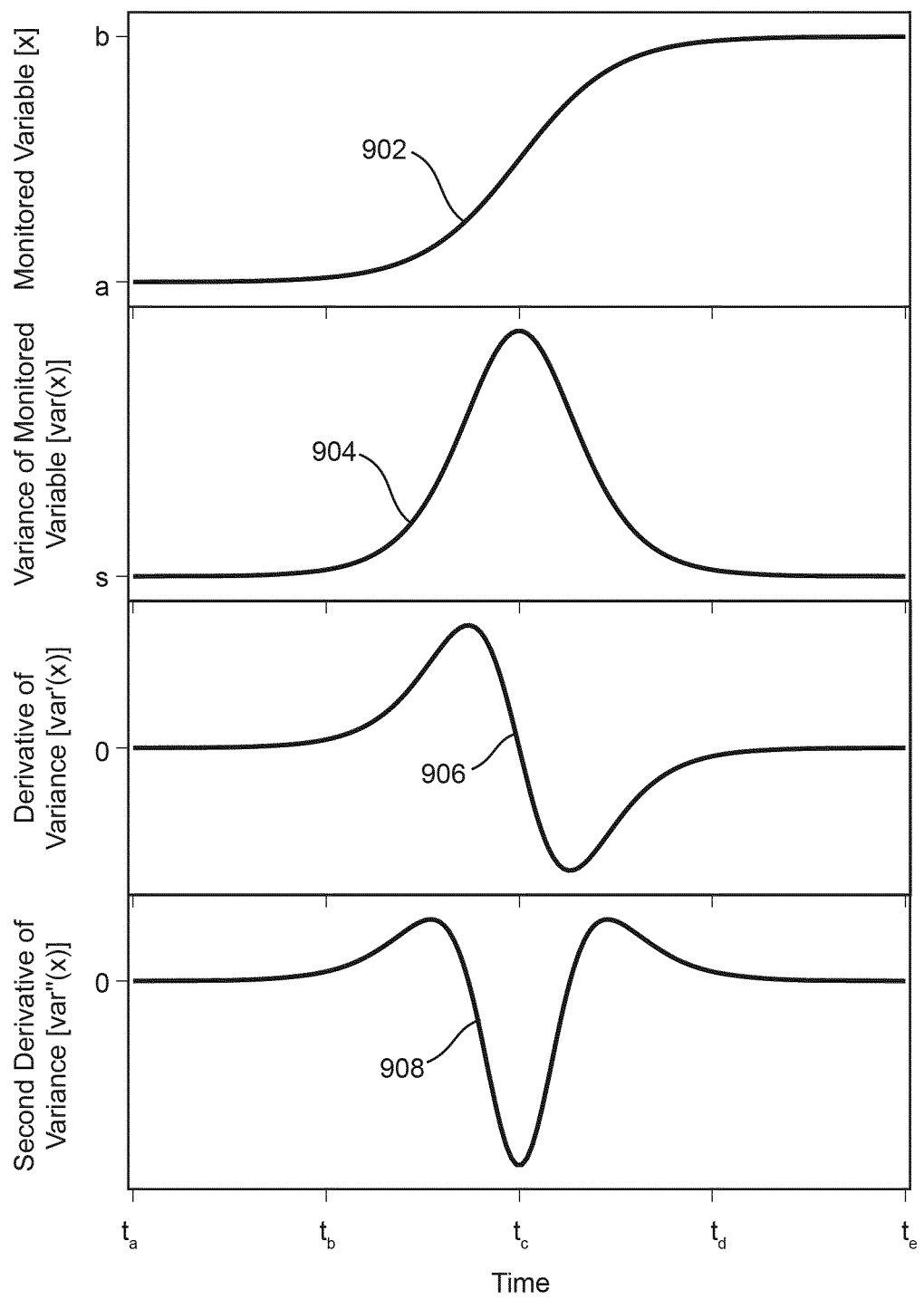
FIG. 9 is a graph illustrating a variable, a variance of the variable, a slop of the variance, and a second derivative of the variance, according to some embodiments.

Referring to FIG. 9, example graphs of a variable, a variance of the variable, a slope of the variance, and a second derivative of the variance over time are illustrated. Curve 902 represents a variable x that changes from steady state a to steady state b. Curve 904 represents the change of variance var(x) as the variable x changes from steady state a to steady state b. Curve 906 represents the change of the slope of variance var'(x) as the variable x changes from steady state a to steady state b. Curve 908 represents the change of the second derivative of the variance var"(x) as the variable x changes from steady state a to steady state b. Five time points are marked on the time axis: the starting time at $t_a$, the beginning of the transient state at $t_b$, the time of maximum variance at $t_c$, the time when the new steady state b has been reached at $t_d$, and the end at $t_e$.

From time points $t_a$ to $t_b$, the variable x is at steady state x=a, the variance var(x)=s, the derivative (i.e., slope) of the variance var'(x)=0, and the second derivative of the variance var"(x)=0. When the transient state starts at $t_b$, the variance var(x), the derivative var'(x), and the second derivative var"(x) start to increase. At time point $t_c$, the variance var(x) reaches a maximum value and starts to decrease afterwards. At this point, the derivative var'(x)=0, and the second derivate var"(x) has a negative value. At time point $t_d$, the variable has reached a new steady state x=b, the variance is close to var(x)=s, the derivative is close to var'(x)=0, and the second derivative var"(x) is positive.

As shown by FIG. 9, when the variable x is at a steady state (i.e., a or b) during time periods $t_a$ through $t_b$ and $t_d$ through $t_e$, the derivative (i.e., slope) of the variance var'(x) is 0 or close to 0. However, the derivate at 0 or close to 0 alone does not necessarily indicate a steady state. For example, at time point $t_c$, the derivative of the variance var'(x) crosses 0. The time point $t_c$ can be distinguished from the steady-state periods $t_a$ through $t_b$ and $t_d$ to $t_e$ by the second derivative of the variance var"(x). At time point $t_c$, the second derivative of the variance var"(x) is negative, while for $t_a$, through $t_b$ and $t_d$ to $t_e$, the second derivative of the variance var"(x) is not negative (i.e., 0 or positive). Therefore, a slope of variance close to 0 and a positive derivative can indicate that a steady state has been reached.

Referring back to FIG. 8, steady state detector 720 is shown to include a slope combiner 820. Slope combiner 820 is shown receiving the mean slope $$\frac{d\hat{z}_i}{dt}$$

from mean slope calculator 808 and the variance slope $$\frac{d\hat{y}_i}{dt}$$

from variance slope calculator 814. Slope combiner 820 can use the following equation to combine mean slope $$\frac{d\hat{z}_i}{dt}$$

and the variance slope $$\frac{d\hat{y}_i}{dt}$$

each time a new sample x of the monitored variables is received:

$$Comb_{slope} = \alpha \frac{d\hat{y}_i}{dt} + (1-\alpha)\frac{d\hat{z}_i}{dt}, \quad (15)$$

where the parameter $\alpha$ has a value $0 \leq \alpha \leq 1$. The variance slope $$\frac{d\hat{y}_i}{dt}$$

has a weight of $\alpha$ in the combined slope $Comb_{slope}$, while the mean slope $$\frac{d\hat{z}_i}{dt}$$

has a weight of $(1-\alpha)$ in the combined slope $Comb_{slope}$. The value of the parameter $\alpha$ can be retrieved from memory, adaptively determined by system 520 or an external system or device, specified by a user, or received from any other data source. In some embodiments, a value of $\alpha=\frac{1}{2}$ (i.e., the variance slope and the mean slope have the same weight in the combined slope) is used, which has worked well in experimental tests. In other embodiments, the combined slope can only use the variance slope (i.e., $\alpha=1$) or only use the mean slope (i.e., $\alpha=0$).

Still referring to FIG. 8, steady state detector 720 is shown to include a condition checker 822. Condition checker 822 is shown receiving the combined slope $$\alpha \frac{d\hat{y}_i}{dt} + (1-\alpha)\frac{d\hat{z}_i}{dt}$$

from slope combiner 820 and the filtered second derivative $r_i$ from second derivative filter 818. Condition checker 822 can be configured to check whether the operation of connected equipment 610 is in a steady state or a transient state. Condition checker 822 can maintain an indicator of current state for the operation of connected equipment 610. As used herein, current state refers to the steady state or transient state determined for the latest sample vector x. For example, if the latest sample vector x is determined to reflect operation under the steady state, the current state then is steady state. If the latest sample vector x is determined to reflect operation under the transient state, the current state then is transient state. The current state indicator can be a one-bit flag, where the flag with a value of 1 indicates current state is steady and the flag with a value of 0 indicates current state is transient. Condition checker 822 can be configured to update the indicator of current state every time a determination is made for a new sample vector x.

In some embodiments, if the current state indicator indicates that the current state is transient, condition checker 822 uses the following conditions to check whether the operation remains in the transient state or has switched to a steady state:

$$Comb_{slope} = \alpha \frac{d\hat{y}_i}{dt} + (1-\alpha)\frac{d\hat{z}_i}{dt} \leq \theta, \quad (16)$$

$$r_i > 0. \quad (17)$$

where the parameter $\theta$ is the threshold value for the combined slope $Comb_{slope}$. As discussed above with reference to FIG. 9, a slope close to 0 and a positive second derivative can indicate that a steady state has been reached. The value of the parameter θ can be retrieved from memory, adaptively determined by system 520 or an external system or device, specified by a user, or received from any other data source. In some embodiments, the value of the parameter θ can be selected using knowledge of the noise properties of the system, or with ad hoc parameters. In an example, an ad hoc value for the parameter is $$\theta = \frac{1}{16}.$$

This value is selected because the number 16 is two times the number of samples taken to estimate the slope in equations (9) and (12). If conditions (16) and (17) hold, condition checker 822 determines that the operation of connected equipment 610 has reached a steady state and updates the current state indicator to indicate the steady state. If condition (16) or (17) or both fail, condition checker 822 determines that the operation of connected equipment 610 remains in the transient state and keeps the current state indicate to indicate the transient state.

In some embodiments, in order to filter out false positive, condition checker 822 determines whether conditions (16) and (17) have held for D consecutive samples. If conditions (16) and (17) have held for D consecutive samples, condition checker 822 determines that the operation of connected equipment 610 has reached a steady state and updates the current state indicator to indicate the steady state. If condition (16) or (17) or both fail to hold for D consecutive samples, condition checker 822 determines that the operation of connected equipment 610 remains in the transient state and keeps the current state indicate to indicate the transient state. In some embodiments, because several filters (e.g., mean filter 806, variance filter 812, second derivative filter 818) have been applied to the calculated values, the likelihood of having false positive values could be very low. For these situations, a value of consecutive samples D=2 is selected, according to some embodiments.

In some embodiments, if the current state indicator indicates that the current state is steady, condition checker 822 uses the following conditions to check whether the operation remains in the steady state or has switched to a transient state:

$$Comb_{slope} = \alpha \frac{d\hat{y}_i}{dt} + (1-\alpha)\frac{d\hat{z}_i}{dt} > \theta, \tag{18}$$

where the parameter θ is the threshold value for the combined slope $Comb_{slope}$. As discussed above with reference to FIG. 9, a large slope can indicate a transient state. The value of the parameter θ can be retrieved from memory, adaptively determined by system 520 or an external system or device, specified by a user, or received from any other data source. In some embodiments, the value of the parameter θ can be selected using knowledge of the noise properties of the system, or with ad hoc parameters. In an example, an ad hoc value for the parameter is $$\theta = \frac{1}{16}.$$

This value is selected because the number 16 is two times the number of samples taken to estimate the slope in equations (9) and (12). If condition (18) holds, condition checker 822 determines that the operation of connected equipment 610 has switched to a transient state and updates the current state indicator to indicate the transient state. If condition (18) fails, condition checker 822 determines that the operation of connected equipment 610 remains in the steady state and keeps the current state indicate to indicate the steady state.

In some embodiments, in order to avoid false negative, condition checker 822 determines whether condition (18) has held for D consecutive samples. If condition (18) has held for D consecutive samples, condition checker 822 determines that the operation of connected equipment 610 has switched to a transient state and updates the current state indicator to indicate the transient state. If condition (18) fails to hold for D consecutive samples, condition checker 822 determines that the operation of connected equipment 610 remains in the steady state and keeps the current state indicate to indicate the steady state. In some embodiments, because several filters (e.g., mean filter 806, variance filter 812, second derivative filter 818) have been applied to the calculated values, the likelihood of having false positive values could be very low. For these situations, a value of consecutive samples D=2 is selected, according to some embodiments.

In other embodiments, condition checker 822 does not wait for condition (18) to hold for D consecutive samples. Rather, when condition (18) holds for one time, condition checker 822 uses the following condition to further check whether the filtered variance $\hat{y}_i$ has undergone significant change:

$$\frac{\hat{y}_i}{\hat{y}_{ss}} \geq \beta, \tag{19}$$

where β is the threshold value for the change of filtered variance $\hat{y}_i$, and $\hat{y}_{ss}$ is a filtered variance for the latest steady state. Condition checker 822 can maintain a filtered variance $\hat{y}_{ss}$ for the most recent steady state. Each time a new sample vector x is received, if condition checker 822 determines that the new sample vector x reflects a steady state (e.g., the current state indicator is updated to or remains at steady), condition checker 822 updates $\hat{y}_{ss}$ with the filtered variance $\hat{y}_i$ of the new sample vector x. If condition checker 822 determines that the new sample vector x reflects a transient state (e.g., the current state indicator is updated to or remains at transient), condition checker 822 does not updates $\hat{y}_{ss}$. The value of the parameter β can be retrieved from memory, adaptively determined by system 520 or an external system or device, specified by a user, or received from any other data source. In an example, the parameter is β=2, and condition (19) becomes:

$$\frac{\hat{y}_i}{\hat{y}_{ss}} \geq 2. \tag{19'}$$

When condition (18) holds for one time, condition checker 822 further checks whether condition (19) (or (19')) holds. If condition (19) holds, condition checker 822 determines that the operation of connected equipment 610 has switched to a transient state and updates the current state indicator to indicate the transient state. If condition (19) fails, condition checker 822 determines that the operation of connected equipment 610 remains in the steady state and keeps the current state indicate to indicate the steady state.

Condition checker 822 can output the determined steady state or transient state data to, for example, predication modeler 722. In some embodiments, prediction modeler 722 receives a sample vector x from variable monitor 718 and a flag 704 indicating the steady or transient state associated with the sample vector x from condition checker 822. In other embodiments, prediction modeler 722 receives sample vectors x each attached with a flag 704 indicating the associated steady or transient state from condition checker 822. If the flag indicates that a particular sample vector x reflects steady state, prediction modeler 722 then uses that sample vector x in constructing the prediction model. If the flag indicates that a particular sample vector x reflects transient state, prediction modeler 722 then does not use that sample vector x in constructing the prediction model.

Steady State Detection Processes

Figure 10A:
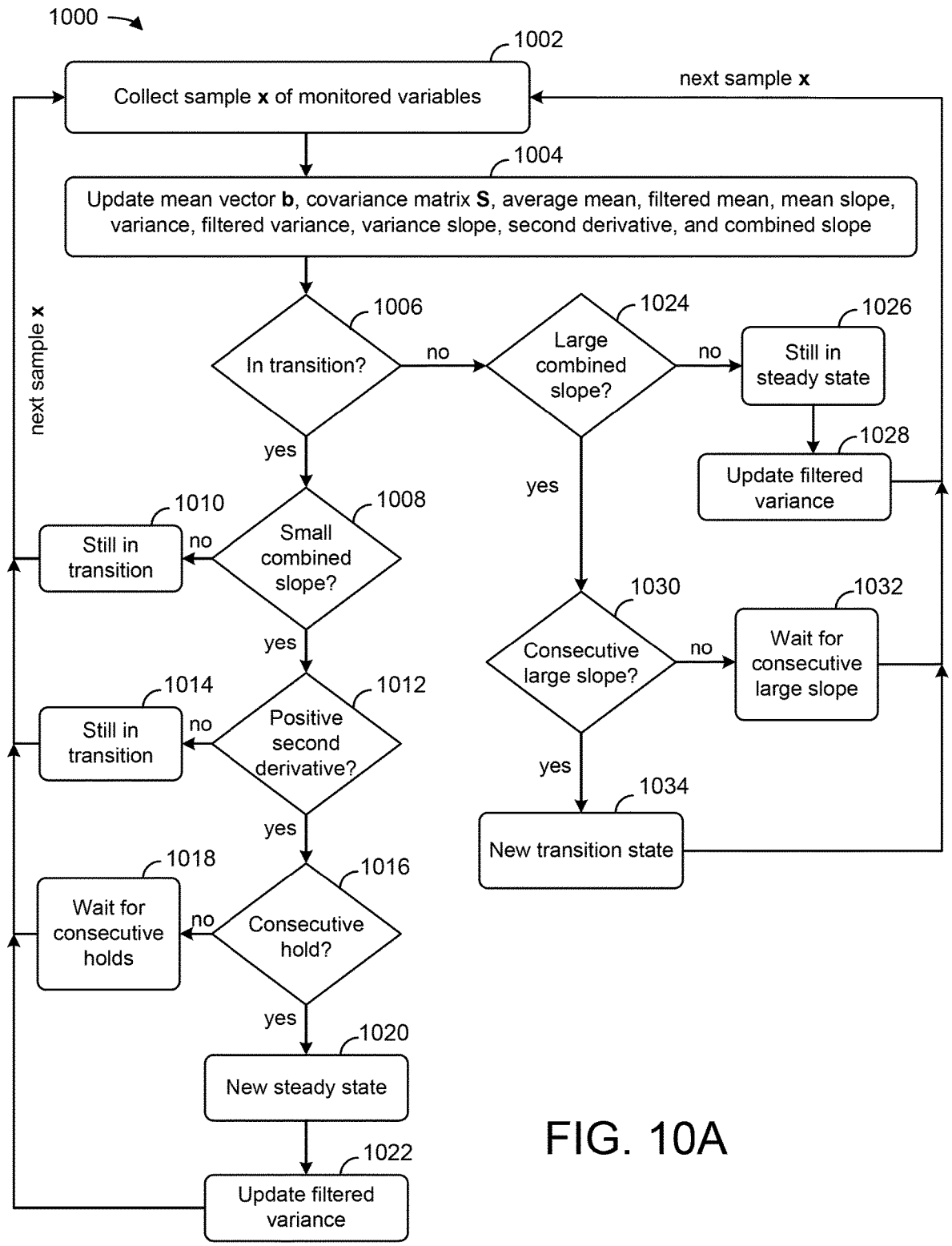
FIG. 10A is a flow diagram of a process which can be performed by the steady state detector of FIG. 8 to automatically detect the steady state for the operation of connected equipment, according to some embodiments.

Referring now to FIG. 10A, a flowchart of a process 1000 for detecting steady state is shown, according to an exemplary embodiment. Process 1000 can be performed by one or more components of predictive diagnostics system 502. In some embodiments, process 1000 is performed by steady state detector 720 as described with reference to FIG. 8. Process 1000 can be implemented as a recursive process and performed each time a new sample x of the monitored variables is obtained.

Process 1000 is shown to include collecting a sample x of monitored variables (step 1002). In some embodiments, step 1002 is performed by variable monitor 718, as described with reference to FIG. 7. The monitored variables may indicate the performance of a monitored system, device, or process. For example, the monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing.

In some embodiments, the monitored variables are received from building subsystems 428 and/or from various devices thereof. For example, the monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices within building subsystems 428. In some embodiments, the monitored variables include n different time-series variables. Step 1002 can include organizing samples of the n time-series variables in a sample vector x, where $x \in \mathcal{R}^n$. The values of the monitored variables in a sample vector x can be recorded or collected at the same time (e.g., measurements of the monitored variables at a particular time).

Process 1000 is shown to include updating the mean vector b, the covariance matrix S, the average mean $z_i$, the filtered mean $\hat{z}_i$, the mean slope $$\frac{d\hat{z}_i}{dt},$$

the average variance $y_i$, the filtered variance $\hat{y}_i$, the variance slope $$\frac{d\hat{y}_i}{dt},$$

the second derivative of the variance $$\frac{d^2\hat{y}}{dt^2},$$

the filtered second derivative $r_i$, and the combined slope $\text{Comb}_{slope}$ (step 1004). In some embodiments, the mean vector b and the covariance matrix S are updated by recursive updater 802, as described with reference to FIG. 8. Step 1004 can include recursively updating the mean vector b and the covariance matrix S each time a new sample x of the monitored variables is collected. In some embodiments, step 1004 includes using equations (4) and (5) to recursively update the mean vector b and the covariance matrix S each time a new sample $x_i$ of the monitored variables is received.

The average mean $z_i$ is updated by mean calculator 804. Step 1004 can include using the values of the mean vector b to calculate the average mean $z_i$. In some embodiments, step 1004 includes using equation (7) to calculate the average mean $z_i$ each time a new sample $x_i$ of the monitored variables is received.

The filtered mean $\hat{z}_i$ is updated by mean filter 806. Step 1004 can include using the average mean $z_i$ to calculate the filtered mean $\hat{z}_i$. In some embodiments, step 1004 includes using equation (8) (or equation (8')) to calculate the filtered mean $\hat{z}_i$ each time a new sample $x_i$ of the monitored variables is received. Any other suitable filters can be used in step 1004 as well.

The mean slope $$\frac{d\hat{z}_i}{dt}$$

is updated by mean slope calculator 808. Step 1004 can include using the filtered mean $\hat{z}_i$ to calculate the mean slope $$\frac{d\hat{z}_i}{dt}.$$

In some embodiments, step 1004 includes using equation (9) to calculate the mean slope $$\frac{d\hat{z}_i}{dt}$$

each time a new sample $x_i$ of the monitored variables is received. Any other suitable technique for calculating the mean slope can be used in step 1004 as well.

The average variance $y_i$ is updated by variance calculator 810. Step 1004 can include using the covariance matrix S to calculate the average variance $y_i$. In some embodiments, step 1004 includes using equation (10) to calculate the average variance $y_i$ each time a new sample $x_i$ of the monitored variables is received.

The filtered variance $\hat{y}_i$ is updated by variance filter 812. Step 1004 can include using the average variance $y_i$ to calculate the filtered variance $\hat{y}_i$. In some embodiments, step 1004 includes using equation (11) (or equation (11')) to calculate the filtered variance $\hat{y}_i$ each time a new sample $x_i$ of the monitored variables is received. Any other suitable filters can be used in step 1004 as well.

The variance slope $$\frac{d\hat{y}_i}{dt}$$

is updated by variance slope calculator 814. Step 1004 can include using the filtered variance $\hat{y}_i$ to calculate the variance slope $$\frac{d\hat{y}_i}{dt}.$$

In some embodiments, step 1004 includes using equation (12) to calculate the variance slope $$\frac{d\hat{y}_i}{dt}$$

each time a new sample $x_i$ of the monitored variables is received. Any other suitable technique for calculating the variance slope can be used in step 1004 as well.

The second derivative of the variance $$\frac{d^2\hat{y}_i}{dt^2}$$

is updated by second derivative calculator 816. Step 1004 can include using the filtered variance $\hat{y}_i$ to calculate the second derivative $$\frac{d^2\hat{y}_i}{dt^2}.$$

In some embodiments, step 1004 includes using equation (13) to calculate the second derivative $$\frac{d^2\hat{y}_i}{dt^2}$$

each time a new sample $x_i$ of the monitored variables is received. Any other suitable technique for calculating the second derivative of the variance can be used in step 1004 as well.

The filtered second derivative $r_i$ is updated by second derivative filter 818. Step 1004 can include using the second derivative of the variance $$\frac{d^2\hat{y}_i}{dt^2}$$

to calculate the filtered second derivative $r_i$. In some embodiments, step 1004 includes using equation (14) to calculate the filtered second derivative $r_i$ each time a new sample $x_i$ of the monitored variables is received. Any other suitable filter can be used in step 1004 as well.

The combined slope $Comb_{slope}$ is updated by slope combiner 820. Step 1004 can include using the mean slope $$\frac{d\bar{z}_i}{dt}$$

and the variance slope $$\frac{d\hat{y}_i}{dt}$$

to calculate the combined slope $Comb_{slope}$. In some embodiments, step 1004 includes using equation (15) to calculate the combined slope $Comb_{slope}$ each time a new sample $x_i$ of the monitored variables is received. Any other suitable techniques can be used to calculate the combined slope in step 1004 as well.

Still referring to FIG. 10A, process 1000 is shown to include determining whether the current state is a transient state or a steady state (step 1006). Current state refers to the steady state or transient state determined for the latest sample vector x. In some embodiments, condition checker 822 maintain an indicator of current state for the operation of connected equipment 610. For example, if the latest sample vector x is determined to reflect operation under the steady state, the current state then is steady state. If the latest sample vector x is determined to reflect operation under the transient state, the current state then is transient state. The current state indicator can be a one-bit flag, where the flag with a value of 1 indicates current state is steady and the flag with a value of 0 indicates current state is transient. In some embodiments, step 1006 includes checking the indicator of the current state to determine whether the current state is transient or steady.

If the current state is determined to be transient in step 1006, process 1000 proceeds to determine whether the combined slope is small (step 1008). In other words, step 1008 is performed in response to a determination in step 1006 that the current state is transient (i.e., the results of step 1006 is "yes"). In some embodiments, step 1008 includes using condition (16) to compare the combined slope $Comb_{slope}$ to a threshold θ. If the combined slope $Comb_{slope}$ is no greater than (e.g., less than or equal to) the threshold θ (i.e., condition (16) holds), it is determined that the combined slope is small. If the combined slope $Comb_{slope}$ is greater than the threshold θ (i.e., condition (16) fails), it is determined that the combined slope is not small.

If the combined slope $Comb_{slope}$ is determined to be not small in step 1008, process 1000 proceeds to determine that the operation of connected equipment 610 is still in the transient state (step 1010). In other words, step 1010 is performed in response to a determination in step 1008 that the combined slope $Comb_{slope}$ is greater than the threshold θ (i.e., condition (16) fails). In some embodiments, step 1010 includes keeping the indicator of the current state in condition checker 822 to indicate transient state. The process 1000 can then return to step 1002.

If the combined slope $Comb_{slope}$ is determined to be small in step 1008, process 1000 proceed to determine whether the second derivative of the variance $$\frac{d^2\hat{y}_i}{dt^2}$$

is positive (step 1012). In other words, step 1012 is performed in response to a determination in step 1008 that the combined slope $Comb_{slope}$ is no greater than (i.e., less than or equal to) the threshold θ (i.e., condition (16) holds). In some embodiments, step 1012 includes using condition (17) to compare the second derivate $$\frac{d^2\hat{y}_i}{dt^2}$$

to 0. If the second derivate $$\frac{d^2\hat{y}_i}{dt^2}$$

is greater than 0 (i.e., condition (17) holds), it is determined that the second derivate $$\frac{d^2\hat{y}_i}{dt^2}$$

is positive. If the second derivate $$\frac{d^2\hat{y}_i}{dt^2}$$

is no greater than 0 (i.e., condition (17) fails), it is determined that second derivate $$\frac{d^2\hat{y}_i}{dt^2}$$

is not positive.

If the second derivate $$\frac{d^2\hat{y}_i}{dt^2}$$

is determined to be not positive in step 1012, process 1000 proceed to determine that the operation of connected equipment 610 are still in the transient state (step 1014). In other words, step 1014 is performed in response to a determination in step 1012 that the second derivate $$\frac{d^2\hat{y}_i}{dt^2}$$

is no greater than 0 (i.e., condition (17) fails). In some embodiments, step 1014 includes keeping the indicator of the current state in condition checker 822 to indicate transient state. The process 1000 can then return to step 1002.

If the second derivate $$\frac{d^2\hat{y}_i}{dt^2}$$

is determined to be positive in step 1012, process 1000 proceed to determine whether several consecutive values of the combined slope $Comb_{slope}$ have been small and several consecutive values of the second derivate $$\frac{d^2\hat{y}_i}{dt^2}$$

have been positive (step 1016). In other words, step 1012 is performed in response to a determination in step 1012 that the second derivate $$\frac{d^2\hat{y}_i}{dt^2}$$

is greater than 0 (i.e., condition (17) holds). The consecutive values of combined slope $Comb_{slope}$ can include the most recent value of $Comb_{slope}$ and several previously calculated values. The consecutive values of $$\frac{d^2\hat{y}_i}{dt^2}$$

can include the most recent value of $$\frac{d^2\hat{y}_i}{dt^2}$$

and several previously calculated values. In some embodiments, two consecutive values of $Comb_{slope}$ and $$\frac{d^2\hat{y}_i}{dt^2}$$

are examined.

If there has not been several (e.g., 2) consecutive values of $Comb_{slope}$ that are small and several consecutive values of $$\frac{d^2\hat{y}_i}{dt^2}$$

that are positive (i.e., the determination in step 1016 is "no"), process 1000 may wait until several consecutive values of $Comb_{slope}$ are small and several consecutive values of $$\frac{d^2 \hat{y}_i}{dt^2}$$

are positive before determining that a new steady state has been reached (step 1018). In step 1018, a counter variable can be updated with the number of consecutive values of $\text{Comb}_{slope}$ that are small and several consecutive values of $$\frac{d^2 \hat{y}_i}{dt^2}$$

that are positive and process 1000 can then return to step 1002. Each time $\text{Comb}_{slope}$ is small and $$\frac{d^2 \hat{y}_i}{dt^2}$$

is positive, the counter can be updated in 1018. Steps 1002-1012 and 1016-1018 can be performed iteratively each time a new sample x is obtained until it is determined in step 1016 that $\text{Comb}_{slope}$ has been small and $$\frac{d^2 \hat{y}_i}{dt^2}$$

has been positive for the predetermined consecutive number of samples and/or iterations of process 1000.

If there are several (e.g., 2) consecutive values of $\text{Comb}_{slope}$ that are small and several consecutive values of $$\frac{d^2 \hat{y}_i}{dt^2}$$

that are positive (i.e., the determination in step 1016 is "yes"), process 1000 may proceed to determine that the operation of connected equipment 610 has reached a new steady state (step 1020). In some embodiments, step 1020 includes updating the indicator of the current state in condition checker 822 to indicate steady state.

Still referring to FIG. 10A, process 1000 in shown to include updating the filtered variance (step 1022). In some embodiments, step 1022 is performed by condition checker 822. Condition checker 822 can maintain a filtered variance $\hat{y}_{ss}$ for the most recent steady state. Each time a new sample vector x is received, if condition checker 822 determines that the new sample vector x reflects a steady state (e.g., the current state indicator is updated to or remains at steady), condition checker 822 updates $\hat{y}_{ss}$ with the filtered variance $\hat{y}_i$ of the new sample vector x. If condition checker 822 determines that the new sample vector x reflects a transient state (e.g., the current state indicator is updated to or remains at transient), condition checker 822 does not updates $\hat{y}_{ss}$. When the filtered variance $\hat{y}_{ss}$ is updated, the process 1000 can then return to step 1002.

Still referring to FIG. 10A, if the current state is determined to be steady in step 1006, process 1000 proceeds to determine whether the combined slope is large (step 1024). In other words, step 1024 is performed in response to a determination in step 1006 that the current state is steady (i.e., the results of step 1006 is "no"). In some embodiments, step 1024 includes using condition (18) to compare the combined slope $\text{Comb}_{slope}$ to a threshold θ. If the combined slope $\text{Comb}_{slope}$ is greater than the threshold θ (i.e., condition (18) holds), it is determined that the combined slope is large. If the combined slope $\text{Comb}_{slope}$ is no greater than (i.e., less than or equal to) the threshold θ (i.e., condition (18) fails), it is determined that the combined slope is not large.

If the combined slope $\text{Comb}_{slope}$ is determined to be not large in step 1024, process 1000 proceeds to determine that the operation of connected equipment 610 is still in the steady state (step 1026). In other words, step 1026 is performed in response to a determination in step 1024 that the combined slope $\text{Comb}_{slope}$ is no greater than the threshold θ (i.e., condition (18) fails). In some embodiments, step 1026 includes keeping the indicator of the current state in condition checker 822 to indicate steady state.

Process 1000 in shown to include updating the filtered variance (step 1028). In some embodiments, step 1028 is performed by condition checker 822. Condition checker 822 can maintain a filtered variance $\hat{y}_{ss}$ for the most recent steady state. Each time a new sample vector x is received, if condition checker 822 determines that the new sample vector x reflects a steady state (e.g., the current state indicator is updated to or remains at steady), condition checker 822 updates $\hat{y}_{ss}$ with the filtered variance $\hat{y}_i$ of the new sample vector x. When the filtered variance $\hat{y}_{ss}$ is updated, process 1000 can then return to step 1002.

If the combined slope $\text{Comb}_{slope}$ is determined to be large in step 1024, process 1000 proceeds to determine whether several consecutive values of the combined slope $\text{Comb}_{slope}$ have been large (step 1030). In other words, step 1030 is performed in response to a determination in step 1024 that the $\text{Comb}_{slope}$ is large (i.e., condition (18) holds). The consecutive values of combined slope $\text{Comb}_{slope}$ can include the most recent value of $\text{Comb}_{slope}$ and several previously calculated values. In some embodiments, two consecutive values of $\text{Comb}_{slope}$ are examined.

If there has not been several (e.g., 2) consecutive values of $\text{Comb}_{slope}$ that are large (i.e., the determination in step 1030 is "no"), process 1000 may wait until several consecutive values of $\text{Comb}_{slope}$ are large before determining that a new transition state has occurred (step 1032). In step 1032, a counter variable can be updated with the number of consecutive values of $\text{Comb}_{slope}$ that are small and process 1000 can then return to step 1002. Each time $\text{Comb}_{slope}$ is large, the counter can be updated in 1030. Steps 1002-1006, 1024, and 1030-1032 can be performed iteratively each time a new sample x is obtained until it is determined in step 1030 that $\text{Comb}_{slope}$ has been large for the predetermined consecutive number of samples and/or iterations of process 1000.

If there are several (e.g., 2) consecutive values of $\text{Comb}_{slope}$ that are large (i.e., the determination in step 1030 is "yes"), process 1000 may proceed to determine that the operation of connected equipment 610 has switched to a new steady state (step 1034). In some embodiments, step 1034 includes updating the indicator of the current state in condition checker 822 to indicate transition state. Process 1000 can then return to step 1002.

Figure 10B:
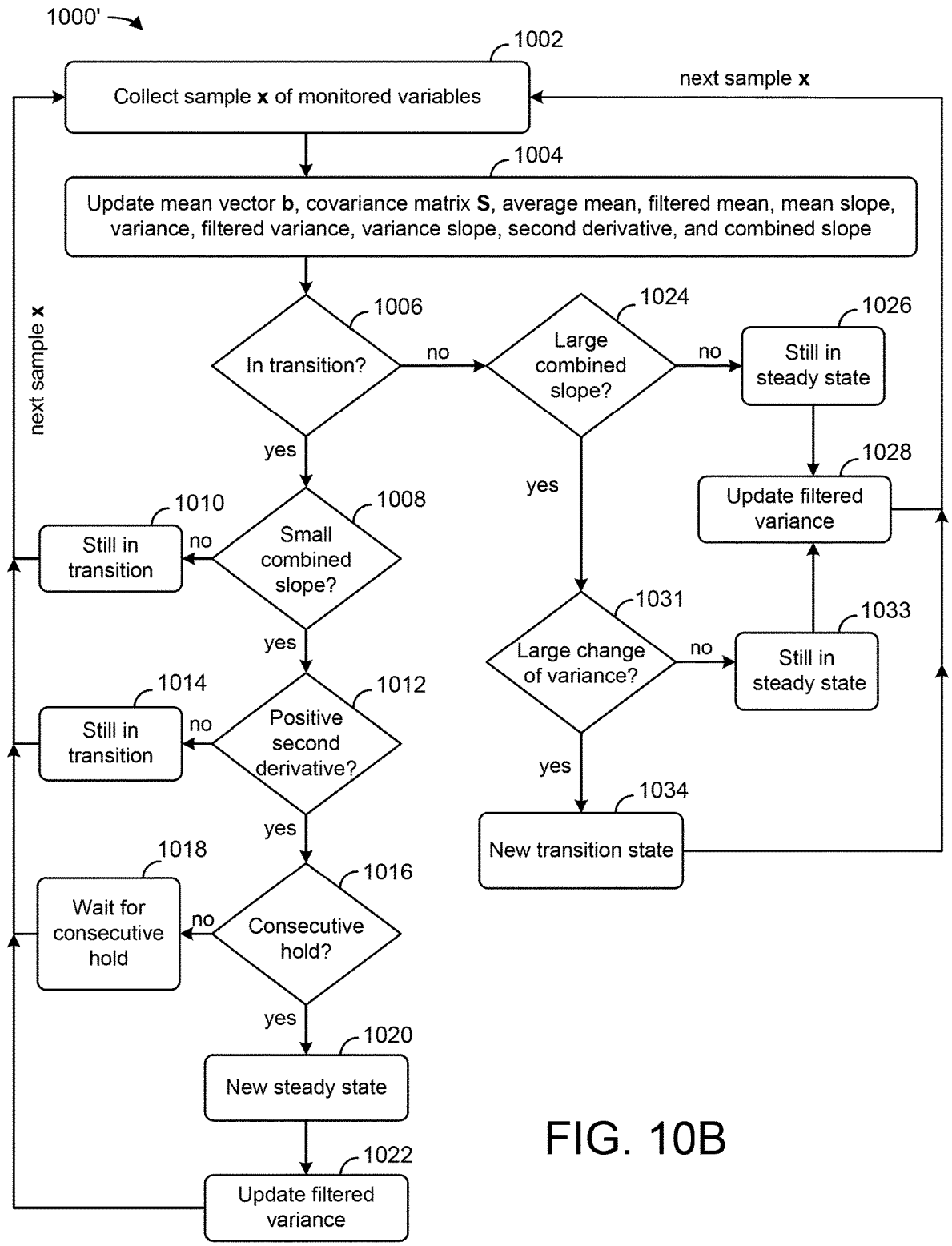
FIG. 10B is a flow diagram of another process which can be performed by the steady state detector of FIG. 8 to automatically detect the steady state for the operation of connected equipment, according to some embodiments.

Referring now to FIG. 10B, a flowchart of a process 1000' for detecting steady state is shown, according to another exemplary embodiment. Process 1000' can include many of the same steps as process 1000, as described with reference to FIG. 10A. For example, process 1000' is shown to include the same steps 1002-1028 as process 1000. Process 1000' does not include step 1030 for determining consecutive large combined slopes. Rather, if the combined slope Comb$_{slope}$ is determined to be large in step 1024, process 1000' proceeds to determine whether a change of variance is large (step 1031). In other words, step 1031 is performed in response to a determination in step 1024 that the combined slope Comb$_{slope}$ is large (i.e., condition (18) holds).

Condition checker 822 can maintain a filtered variance $\hat{y}_{ss}$ for the most recent steady state. Each time a new sample vector x is received, if condition checker 822 determines that the new sample vector x reflects a steady state (e.g., the current state indicator is updated to or remains at steady), condition checker 822 updates $\hat{y}_{ss}$ with the filtered variance $\hat{y}_i$ of the new sample vector x. If condition checker 822 determines that the new sample vector x reflects a transient state (e.g., the current state indicator is updated to or remains at transient), condition checker 822 does not updates $\hat{y}_{ss}$. In some embodiments, step 1031 includes comparing the filtered variance $\hat{y}_i$ of the new sample vector x against the stored $\hat{y}_{ss}$. For example, step 1031 includes using condition (19) (or condition (19)') to compare $$\frac{\hat{y}_i}{\hat{y}_{ss}}$$

to a threshold β (e.g., β=2). If $$\frac{\hat{y}_i}{\hat{y}_{ss}}$$

is greater than β (condition (19) or (19') holds), it is determined that the change of the variance is large. If the $$\frac{\hat{y}_i}{\hat{y}_{ss}}$$

is no greater than (i.e., less than or equal to) β (i.e., condition (19) or (19)' fails), it is determined that the change of the variance is not large.

If the change of variance is determined to be not large in step 1031, process 1000' proceeds to determine that the operation of connected equipment 610 is still in the steady state (step 1033). In other words, step 1033 is performed in response to a determination in step 1031 that the change of variance is not large (i.e., condition (19) or (19)' fails). In some embodiments, step 1033 includes keeping the indicator of the current state in condition checker 822 to indicate steady state. Process 1000' then proceeds to update the filtered variance (step 1028). When the filtered variance $\hat{y}_{ss}$ is updated, process 1000' can then return to step 1002.

If the change of variance is determined to be large in step 1031, process 1000' proceeds to determine that the operation of connected equipment 610 has switched to a new steady state (step 1034). In some embodiments, step 1034 includes updating the indicator of the current state in condition checker 822 to indicate transition state. Process 1000' then returns to step 1002.

Experiments and Test Results

Figure 11A:
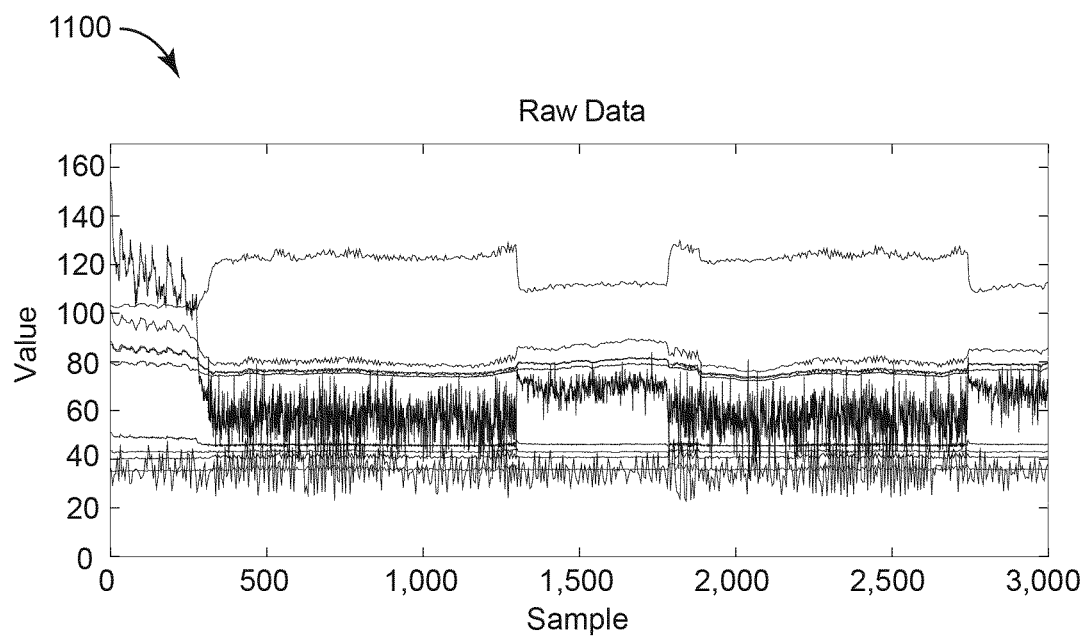
FIG. 11A is a graph illustrating the raw data of monitored variables associated with operation of a chiller, according to some embodiments.
Figure 11B:
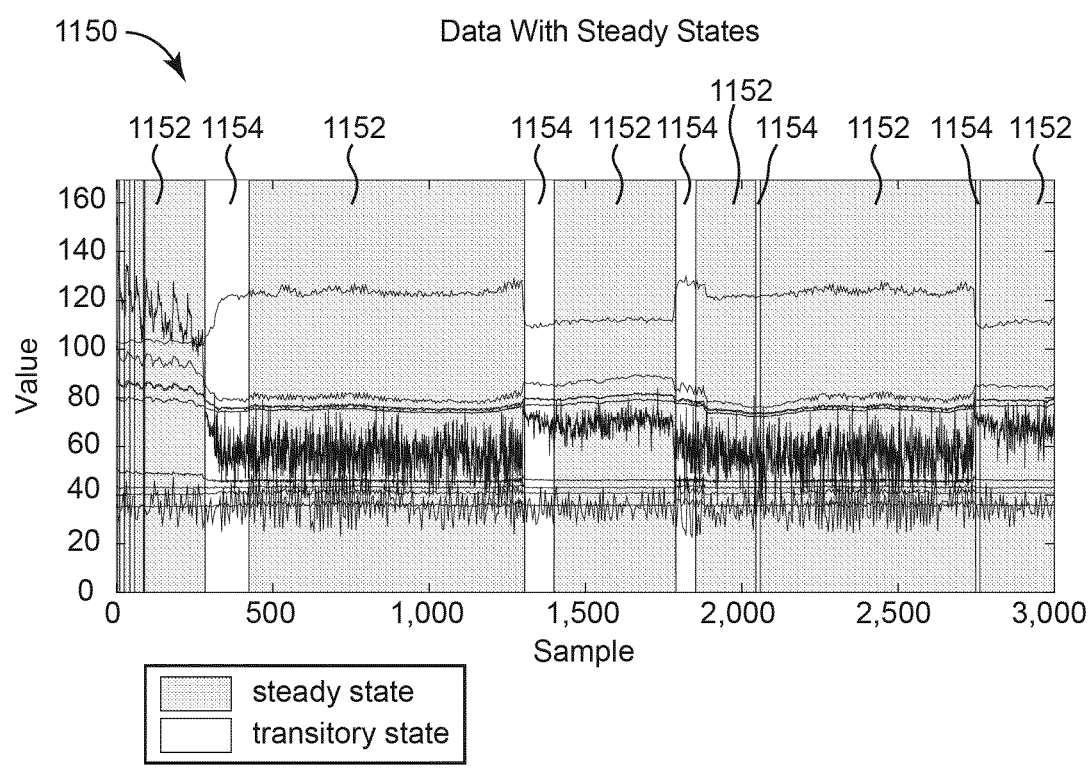
FIG. 11B is a graph illustrating data of FIG. 11A with data associated with steady states identified using the steady state detector of FIG. 8, according to some embodiments.
Figure 12A:
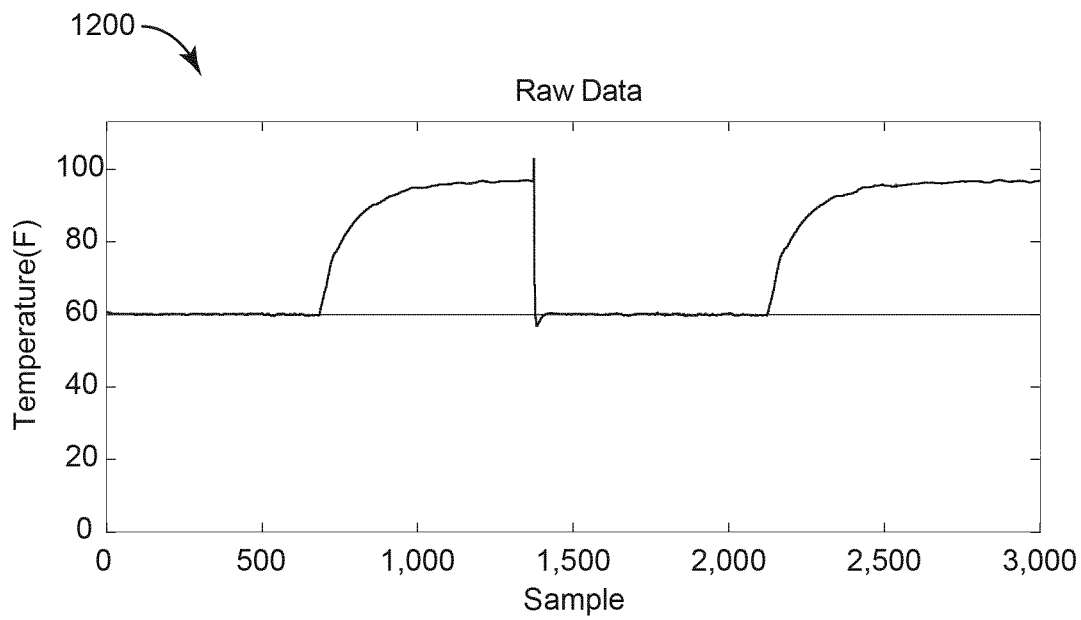
FIG. 12A is a graph illustrating the raw data of monitored variables associated with operation of an air handling unit (AHU), according to some embodiments.
Figure 12B:
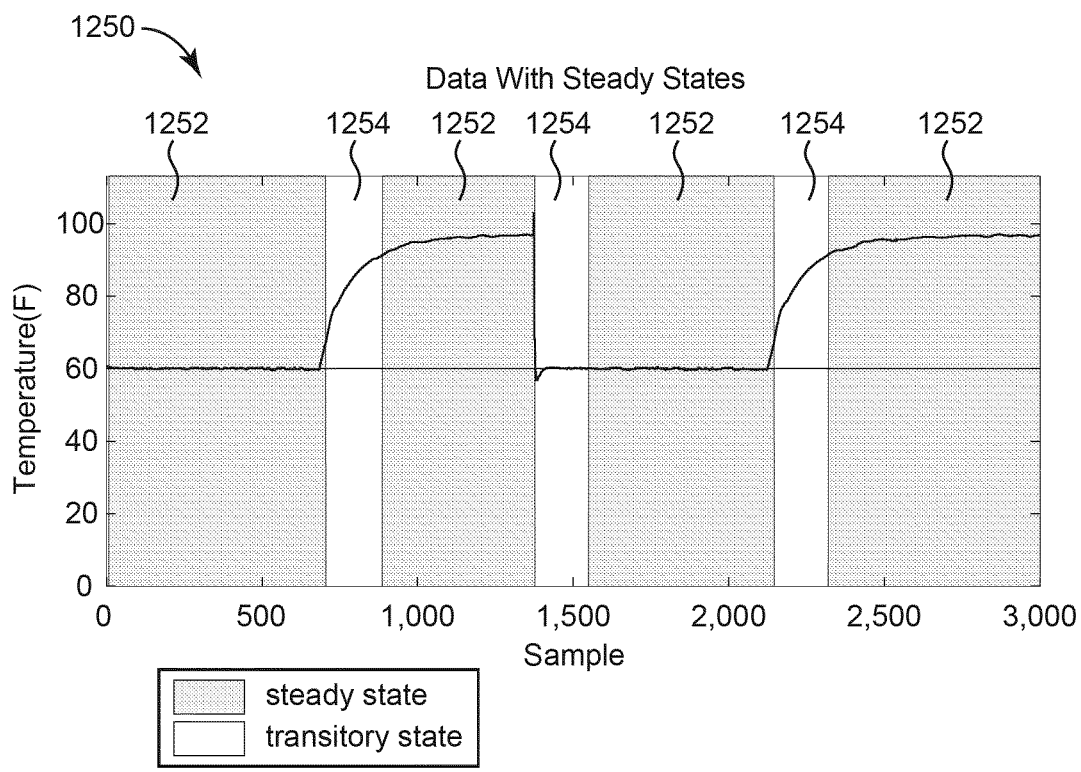
FIG. 12B is a graph illustrating data of FIG. 12A with data associated with steady states identified using the steady state detector of FIG. 8, according to some embodiments.

In order to evaluate the performance of the methods and systems disclosed herein, tests were conducted using data from a chiller and an AHU. Graphs illustrating the chiller test and results are shown in FIGS. 11A-11B. Graphs illustrating the AHU test and results are shown in FIGS. 12A-12B.

Referring now to FIGS. 11A and 11B, a pair of graphs 1100 and 1150 illustrating a test implementation of the systems and methods for steady state detection as described herein are shown, according to an exemplary embodiment. FIG. 11A is a graph 1100 illustrating the raw data of monitored variables associated with operation of a chiller, and FIG. 11B is a graph 1150 illustrating data of FIG. 11A with data associated with steady states identified using the steady state detector of FIG. 8.

The data set used to test the method was from a YK chiller, which consists of 3000 measurements from 11 variables sampled at a rate of 1 minute. The variables are shown in Table 3. The selected time constant of the process was 40 minutes. Each of the monitored chiller variables is represented by one of the lines in graph 1100.

TABLE 3

| Monitored Chiller Variables | |
| --- | --- |
| Variables | Units |
| Leaving condenser water temperature | F |
| Entering condenser water temperature | F |
| Condenser pressure | PSI |
| Evaporator pressure | PSI |
| Entering chilled water temperature | F |
| Leaving chilled water temperature | F |
| Refrigerant level position | % |
| Discharge temperature | F |
| Condenser saturation temperature | F |
| Evaporator saturation temperature | F |
| Compressor power | kW |

FIG. 11B shows that the method successfully tells when the monitored variables undergo a transition and when they reach a new steady state. Shaded regions 1152 in graph 1150 indicate the time periods marked as steady state by steady state detector 720, whereas non-shaded regions 1154 in graph 1150 indicate the time periods marked as transient state by steady state detector 720. The data set shows spikes caused by the outliers at some points, for example, around sample 20150. The method identifies these as transitions but immediately changes back to steady state.

Referring now to FIGS. 12A and 12B, a pair of graphs 1200 and 1250 illustrating a test implementation of the systems and methods for steady state detection as described herein are shown, according to an exemplary embodiment. FIG. 12A is a graph 1200 illustrating the raw data of monitored variables associated with operation of an AHU, and FIG. 12B is a graph 1250 illustrating data of FIG. 12A with data associated with steady states identified using the steady state detector of FIG. 8.

The data set used to test the method was from an AHU. The monitored variables consist of the discharge air temperature and the set point. Each of the monitored AHU variables is represented by one of the lines in graph 1200. The data was sampled at a rate of 1 minute. The selected time constant of the process was 40 minutes. Shaded regions 1252 in graph 1250 indicate the time periods marked as steady state by steady state detector 720, whereas non-shaded regions 1254 in graph 1250 indicate the time periods marked as transient state by steady state detector 720. FIG. 12B shows that the method immediately detected the transition state when it occurs at around samples 700, 1390, and 2150. The method also identified steady states around samples 990, 1550, and 2320.

Comparison with a Model-Based Method

The performance of the steady state detection method disclosed herein was compared with an energy balance steady state detection method, which performs a residual energy balance in a chiller.

Both methods are used to extract steady state data from a data set obtained from the operation of a chiller. The steady state data was used to calculate the coefficients of two regression models for predicting the power consumed in a chiller. The Bi-Quadratic 9 Parameter (BQA9) model and the Gordon-Ng (GN) model were used as the prediction model. The performance was evaluated by the ability to predict the power consumed by the chiller using the extracted steady state data, and by the root mean squared prediction error (RMSPE) of the model.

The energy balance method calculates a residual energy $Q_{res}$ using the heat transferred in the evaporator $Q_{evap}$, the heat transferred in the condenser $Q_{cond}$, and the power used in the compressor $W_{comp}$. For example, the energy balance method uses the following equations:

$$Q_{res} = Q_{evap} + W_{com} - Q_{cond}.$$

where the percentage of residual energy is calculated as:

$$\% \, Q_{res} = 100 \left( 1 - \frac{2|Q_{res}|}{Q_{evap} + W_{comp} + Q_{cond}} \right).$$

If $\% \, Q_{res} > 70$, it was determined that the operation of the chiller has reached a steady state. The heat transferred in the evaporator $Q_{evap}$ and the heat transferred in the condenser $Q_{cond}$ were calculated from measurements of the inlet evaporator water temperature $T_{evap,in}$, outlet evaporator temperature $T_{evap,out}$, evaporator water flow $G_{evap}$, inlet condenser water temperature $T_{cond,in}$, outlet condenser water temperature $T_{cond,out}$, and condenser water flow $G_{cond}$. The calculation was as follows:

$$Q_{evap} = k_c c_w G_{evap}(T_{evap,in} - T_{evap,out}),$$

$$Q_{cond} = k_c c_w G_{cond}(T_{cond,out} - T_{cond,in}),$$

where $c_w$ is the specific heat of water $$\left( \text{i.e., } c_w = 4.186 \frac{kJ}{kg^\circ \, C.} \right),$$

and $k_c$ is a factor used to convert the values to proper units.

The BQA9 model has the following form:

$$W_{comp} = \beta_1 + \beta_2(T_{cond,out} - T_{evap,out}) + \beta_3 Q_{evap} + \beta_4(T_{cond,out} - T_{evap,out})Q_{evap} + \beta_5(T_{cond,out} - T_{evap,out})^2 + \beta_6(T_{cond,out} - T_{evap,out})^2 Q_{evap} + \beta_7 Q_{evap}^2 + \beta_8(T_{cond,out} - T_{evap,out})Q_{evap}^2 + \beta_9(T_{cond,out} - T_{evap,out})^2 Q_{evap}^2$$

and the Gordon-Ng model has the following form:

$$\left( \frac{W_{comp}}{Q_{evap}} + 1 \right) \frac{T_{evap,out}}{T_{cond,out}} - 1 =$$

$$c_1 \frac{T_{evap,out}}{Q_{evap}} + c_2 \frac{T_{cond,out} - T_{evap,out}}{T_{cond,out} Q_{evap}} + c_3 \frac{\left( \frac{W_{comp}}{Q_{evap}} + 1 \right) Q_{evap}}{T_{cond,out}}$$

The data used in the tests cover six months of the operation of a chiller. The monitored variables are listed in Table 4.

TABLE 4

Monitored Chiller Variables

| Name | Variable | Units |
|---|---|---|
| Inlet condenser water temperature | $T_{cond,in}$ | F |
| Outlet condenser water temperature | $T_{cond,out}$ | F |
| Inlet evaporator water temperature | $T_{evap,in}$ | F |
| Outlet evaporator water temperature | $T_{evap,out}$ | F |
| Evaporator pressure | $P_{evap}$ | PSI |
| Condenser pressure | $P_{cond}$ | PSI |
| Saturation temperature in evaporator | $T_{r,evap,sat}$ | F |
| Saturation temperature in condenser | $T_{r,cond,sat}$ | F |
| Discharge temperature | $T_{r,comp,out}$ | F |
| Compressor power | $W_{comp}$ | kW |
| Water flow in evaporator | $G_{evap}$ | GPM |
| Water flow in condenser | $G_{cond}$ | GPM |

The variables were measured every 15 minutes, and a data set of 17372 samples were produced. The data was converted to appropriate units and filtered before the steady detection methods were applied, depending on the methods. The original units of the data were a mix of imperial and international units. The measurements were transformed to international units. In particular, the transformation from degrees Fahrenheit to Celsius is:

$$^\circ C. = (^\circ F. - 32)/1.8.$$

The conversion from gallons per minutes (GPM) to kilograms per second is done by multiplying the GPM value by the following constant:

$$k_c = \frac{(1000 \text{ kg})(1 \text{ min})}{(264.172 \text{ gal})(60 \text{ sec})}$$

and the specific heat of water is set to a value of $$c_w = 4.186 \frac{kJ}{kg^\circ \, C.}.$$

The energy balance method used the following filters to filter the data:

Filter 1: $W_{comp} > W_{comp,min}$

Filter 2: $\frac{100 Q_{evap}}{Q_{rated}} > \% \, Q_{evap,min}$

Filter 3: $Q_{evap} \geq 0$

Filter 4: $Q_{cond} \geq 0$, where $W_{comp,min}=15$ kW, and % $Q_{evap,min}=10$. In this case, $$Q_{rated} = (336 \text{ ton})\left(\frac{3516 \text{ kW}}{1 \text{ ton}}\right).$$

After the filters were applied, the usable data decreased to 7760 samples.

In the multivariate statistical method for steady state detection as disclosed herein, data was used as-is because the method does not require any knowledge of the process that produced the data. Thus, no filtering was applied here. Furthermore, no unit conversion was applied because the method only used the rate of change of a variable, not the actual magnitude of the variable. However, the units of the data might affect the rate of change.

The energy balanced method identified a set of 794 samples associated with steady state, and the multivariate statistical method (i.e., the method of the present disclosure) identified a set of 15030 samples associated with steady state. However, in the multivariate statistical method, some of the samples corresponded to the situation when the chiller was turned off. These points were removed before the steady state data was used to calculate the coefficients of the BQA9 and GN models. The same filters 1, 2, 3, and 4 were applied. After filtering out the data when the chiller was off, the set of usable data decreased to 6092 samples.

After steady state were identified, data associated with steady state were split into training and testing sets for calculating the coefficients of the chiller models and evaluating the prediction performance. For each method, the training set was built with 75% of the steady state data, and the testing set with the rest.

After the coefficients of the EQA9 and GN models were calculated with the training sets, the models were used to predict the power consumption on the testing sets. The performance of each model was evaluated by the square-root of the average squared predicated error (RMSPE). The performance of both models with data sets is shown in Table 5 below.

TABLE 5

| RMSPE Values of the Fitted Chiller Models | | |
|---|---|---|
| Method | BQA9 | Gordon-Ng |
| Energy Balance | 5.275 | 5.838 |
| Multivariate Statistics | 5.277 | 5.295 |

These results in Table 5 showed that for the Gordon-Ng model, the steady state data provided by the multivariate statistics method was better than the energy balance method in estimating the model parameters. The BQA9 model showed a very similar performance for both methods.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method comprising:
   receiving samples of one or more monitored variables relating to building equipment;
   updating a statistical metric of the samples;
   determining whether the building equipment is operating in a steady state or operating in a transient state using the statistical metric of the samples; and
   adjusting an operation that uses the samples as an input based on whether the building equipment is operating in the steady state or operating in the transient state.

2. The method of claim 1, wherein updating the statistical metric comprises updating a variance of the samples to reflect a new sample of the one or more monitored variables.

3. The method of claim 1, wherein updating the statistical metric comprises updating a plurality of statistical metrics comprising a mean of the samples and a variance of the samples.

4. The method of claim 1, wherein adjusting the operation that uses the samples as the input based on whether the building equipment is operating in the steady state or operating in the transient state comprises:
   building a model for predicting performance of the building equipment using a first set of the samples associated with the steady state and excluding a second set of the samples associated with the transient state;
generating control decisions using the model; and
controlling the building equipment in accordance with the control decisions.

5. The method of claim 1, wherein adjusting the operation that uses the samples as the input based on whether the building equipment is operating in the steady state or operating in the transient state comprises detecting or diagnosing a fault associated with the building equipment using a first set of the samples associated with the steady state and excluding a second set of the samples associated with the transient state.

6. The method of claim 1, wherein adjusting the operation that uses the samples as the input based on whether the building equipment is operating in the steady state or operating in the transient state comprises suppressing an alarm associated with the building equipment when the building equipment is operating in the transient state.

7. The method of claim 1, wherein the samples are associated with a plurality of time steps, the method further comprising generating a plurality of indicators indicating whether the plurality of time steps are associated with the transient state or the steady state.

8. The method of claim 1, wherein receiving the samples comprises receiving the samples at a cloud-based computing system and the method is performed at least partially by the cloud-based computing system.

9. A system comprising:
one or more circuits configured to perform operations comprising:
receiving samples of one or more monitored variables relating to building equipment;
updating a statistical metric of the samples;
determining whether the building equipment is operating in a steady state or operating in a transient state using the statistical metric of the samples; and
adjusting an operation that uses the samples as an input based on whether the building equipment is operating in the steady state or operating in the transient state.

10. The system of claim 9, wherein the system is a cloud-based computing system.

11. The system of claim 9, wherein updating the statistical metric comprises updating a variance of the samples to reflect a new sample of the one or more monitored variables.

12. The system of claim 9, wherein updating the statistical metric comprises updating a plurality of statistical metrics comprising a mean of the samples and a variance of the samples.

13. The system of claim 9, wherein the one or more circuits are configured to adjust the operation that uses the samples as the input based on whether the building equipment is operating in the steady state or operating in the transient state by preventing a fault detection when the building equipment is operating in the transient state.

14. The system of claim 9, wherein the samples are associated with a plurality of time steps and the operations further comprise generating a plurality of indicators indicating whether the plurality of time steps are associated with the transient state or the steady state.

15. The system of claim 9, wherein the one or more circuits are configured adjust the operation that uses the samples as the input based on whether the building equipment is operating in the steady state or operating in the transient state by:
building a model for predicting performance of the building equipment using a first set of the samples associated with the steady state and excluding a second set of the samples associated with the transient state;
generating control decisions using the model; and
controlling the building equipment in accordance with the control decisions.

16. One or more non-transitory computer-readable media storing instructions that, when executed by one or more processors, cause the one or more processors to perform operations comprising:
receiving samples of one or more monitored variables relating to building equipment;
updating a statistical metric of the samples;
determining whether the building equipment is operating in a steady state or operating in a transient state using the statistical metric of the samples; and
adjusting an operation that uses the samples as an input based on whether the building equipment is operating in the steady state or operating in the transient state.

17. The one or more non-transitory computer-readable media of claim 16, wherein updating the statistical metric comprises updating a variance of the samples to reflect a new sample of the one or more monitored variables.

18. The one or more non-transitory computer-readable media of claim 16, wherein updating the statistical metric comprises updating a plurality of statistical metrics comprising a mean of the samples and a variance of the samples.

19. The one or more non-transitory computer-readable media of claim 16, wherein adjusting the operation that uses the samples as the input based on whether the building equipment is operating in the steady state or operating in the transient state comprises:
building a model for predicting performance of the building equipment using a first set of samples associated with the steady state and excluding a second set of the samples associated with the transient state;
generating control decisions using the model; and
controlling the building equipment in accordance with the control decisions.

20. The one or more non-transitory computer-readable media of claim 16, wherein adjusting the operation that uses the samples as the input based on whether the building equipment is operating in the steady state or operating in the transient state comprises preventing a fault detection when the building equipment is operating in the transient state.

* * * * *